(12) United States Patent
Banning et al.

(10) Patent No.: US 9,738,811 B2
(45) Date of Patent: Aug. 22, 2017

(54) PHASE CHANGE INKS CONTAINING WAX-SOLUBLE NEAR-INFRARED DYES

(71) Applicant: XEROX CORPORATION, Norwalk, CT (US)

(72) Inventors: Jeffrey H. Banning, Hillsboro, OR (US); Jule W. Thomas, Jr., West Linn, OR (US); Bo Wu, Wilsonville, OR (US); Stephan V. Drappel, Toronto (CA)

(73) Assignee: XEROX CORPORATION, Norwalk, CT (US)

( * ) Notice: Subject to any disclaimer, the term of this patent is extended or adjusted under 35 U.S.C. 154(b) by 228 days.

(21) Appl. No.: 13/975,933

(22) Filed: Aug. 26, 2013

(65) Prior Publication Data

US 2015/0056420 A1 Feb. 26, 2015

(51) Int. Cl.

| | | |
|---|---|---|
| *C09D 175/04* | (2006.01) | |
| *C08K 5/13* | (2006.01) | |
| *C08K 5/1545* | (2006.01) | |
| *C08K 5/18* | (2006.01) | |
| *C08K 5/3415* | (2006.01) | |
| *C08K 5/3417* | (2006.01) | |
| *C08K 5/3437* | (2006.01) | |
| *C08K 5/3465* | (2006.01) | |
| *C08K 5/45* | (2006.01) | |
| *C08K 5/47* | (2006.01) | |
| *C08G 18/48* | (2006.01) | |
| *C08G 18/71* | (2006.01) | |
| *C08G 18/75* | (2006.01) | |
| *C09D 11/30* | (2014.01) | |
| *C09D 11/12* | (2006.01) | |
| *C09D 11/328* | (2014.01) | |
| *C09D 11/34* | (2014.01) | |
| *C09D 11/38* | (2014.01) | |
| *C09B 57/00* | (2006.01) | |

(52) U.S. Cl.
CPC ....... *C09D 175/04* (2013.01); *C08G 18/4829* (2013.01); *C08G 18/71* (2013.01); *C08G 18/755* (2013.01); *C08K 5/13* (2013.01); *C08K 5/1545* (2013.01); *C08K 5/18* (2013.01); *C08K 5/3415* (2013.01); *C08K 5/3417* (2013.01); *C08K 5/3437* (2013.01); *C08K 5/3465* (2013.01); *C08K 5/45* (2013.01); *C08K 5/47* (2013.01); *C09B 57/007* (2013.01); *C09D 11/12* (2013.01); *C09D 11/30* (2013.01); *C09D 11/328* (2013.01); *C09D 11/34* (2013.01); *C09D 11/38* (2013.01); *Y10T 428/24802* (2015.01)

(58) Field of Classification Search
CPC .. C08G 18/4829; C08G 18/71; C08G 18/755; C09D 11/30; C09D 175/04; C09D 11/34; C09D 11/328; C09D 11/12; C09D 11/38; C08K 5/13; C08K 5/47; C08K 5/3437; C08K 5/3465; C08K 5/3417; C08K 5/3415; C08K 5/18; C08K 5/1545; C08K 5/45; C09B 57/007; Y10T 428/24802

See application file for complete search history.

(56) References Cited

U.S. PATENT DOCUMENTS

| | | | |
|---|---|---|---|
| 4,565,424 | A | 1/1986 | Huffman et al. |
| 5,380,635 | A | 1/1995 | Gomez et al. |
| 5,763,134 | A | 6/1998 | Busman et al. |
| 5,782,966 | A | 7/1998 | Bui et al. |
| 5,959,105 | A | 9/1999 | Harada et al. |
| 6,048,925 | A * | 4/2000 | Titterington et al. ......... 524/590 |
| 6,174,937 | B1 | 1/2001 | Banning et al. |
| 6,309,453 | B1 | 10/2001 | Banning et al. |
| 6,329,128 | B1 | 12/2001 | Helland et al. |
| 6,348,592 | B1 | 2/2002 | Ramsden et al. |
| 6,515,811 | B2 | 2/2003 | Ikuhara et al. |
| 6,605,416 | B2 | 8/2003 | Busman et al. |
| 8,884,012 | B1 | 11/2014 | Banning |
| 9,193,869 | B2 | 11/2015 | Banning |
| 2009/0136681 | A1* | 5/2009 | Belelie .................... C08F 22/20 427/532 |
| 2010/0025641 | A1 | 2/2010 | Jimbo et al. |
| 2010/0055484 | A1* | 3/2010 | Chretien .............. C09D 11/101 428/484.1 |
| 2010/0071592 | A1 | 3/2010 | Tian et al. |
| 2011/0263890 | A1* | 10/2011 | Chopra ................. C07C 233/36 560/145 |
| 2012/0162333 | A1* | 6/2012 | Chopra et al. ................ 347/102 |
| 2012/0274700 | A1 | 11/2012 | Belelie et al. |

FOREIGN PATENT DOCUMENTS

| | | | | |
|---|---|---|---|---|
| EP | 1985667 A2 | 10/2008 | | |
| WO | 2013087631 | 6/2012 | | |
| WO | WO2010089943 | * | 8/2012 | ............. C09D 11/02 |

OTHER PUBLICATIONS

English translation of WO/2010/089943, pp. 1-16.*

(Continued)

*Primary Examiner* — Alexander Kollias

(74) *Attorney, Agent, or Firm* — MH2 Technology Law Group LLP

(57) ABSTRACT

Phase change ink compositions having a phase change carrier composition containing a wax and a wax-soluble near-infrared (NIR) dye having an absorption maximum in the wavelength region from about 700 nm to about 1400 nm. Near-infrared prints prepared with such phase change ink compositions. Methods of producing a layer of such a phase change ink on the surface of a substrate.

18 Claims, 2 Drawing Sheets

(56) References Cited

OTHER PUBLICATIONS

Pekarovicova et al, Phase Change Inks, Journal of Coatings Technology, Jan. 2003, vol. 75, Issue 936, pp. 65-72.*
Do More with UV-Curable Inks: How UV Curable Inks Work; What You Can Do with Them, Hewlett Packard, pp. 1-8, Oct. 2013.*
Reis et al, The synthesis and characterization of novel, aza-substituted squarylium cyanine dyes, Dyes and Pigments, vol. 81, Issue 3, Jun. 2009, pp. 197-202.*
Yagi et al, Synthesis and Light Absorption/Emission Properties of Novel Bis-squaraine Dyes With Extensively Conjugated π-Electron Systems, J. Chem. Soc., Perkin Trans. I, Mar. 27, 2002, pp. 1417-1419.*
Yagi et al, The Synthesis and Optical Properties of Bis-squarylium Dyes Bearing Arene and Thiophene Spaces, Dyes and Pigments, vol. 77, Issue 3, pp. 525-536, 2008.*
Mayerhöffer et al, Bright New-Infrared Fluorophores Based on Squaraines by Unexpected Halogen Effects, Angewandte Chemie International Edition, vol. 51 Issue 1, pp. 164-167, Jan. 2, 2012.*
Bello, Kasali A. et al. Near-Infrared-absorbing Squaraine Dyes containing 2,3-Dihydroperimidine Terminal Groups, Journal of Chemical Society, Chemical Communications (5), 452-4 (1993).
Umezawa, et al. Water-soluble NIR fluorescent probes based on squaraine and their application for protein labeling, Analytical Sciences, 24(2), 213-217 (2008).
Banning et al., "Dye Compound and Method of Making the Compound", U.S. Appl. No. 13/975,837, filed Aug. 26, 2013.
Banning et al., "Dye Compounds, Method of Making the Compounds and Ink Composition Employing the Compounds", U.S. Appl. No. 13/975,714, filed Aug. 26, 2013.
Pfüller et al., "Sudan Black B: Chemical Structure and Histochemistry of the Blue Main Components*", Histochemistry 54, 1977, pp. 237-250.
Park et al., "The Novel Functional Chromophores Based on Squarylium Dyes", Bull. Korean Chem. Soc. vol. 26, No. 3, 2005, pp. 428-432.
Maeda et al., "Near-infrared Absorbing Squarylium Dyes with Linearly Extended π-Conjugated Structure for Dye-sensitized Solar Cell Applications", American Chemical Society, 2011, Abstract Only, 1 page.
Author Unknown, Solvent Soluble Near Infrared Absorption Dye ADS830AT, American Dye Source, Inc., Product Bulletin, Sep. 2006, 1 page.
Author Unknown, Near Infrared Laser Dye for Printing Applications ADS775MI, American Dye Source, Inc., Product Bulletin, Nov. 2004, 1 page.
Author Unknown, Near Infrared Laser Dye for Printing Applications ADS775MP, American Dye Source, Inc., Product Bulletin, Oct. 2006, 1 page.
Author Unknown, Near Infrared Laser Dye for Printing Applications ADS775PI, American Dye Source, Inc., Product Bulletin, Nov. 2004, 1 page.
Author Unknown, Near Infrared Laser Dye for Printing Applications ADS775PP, American Dye Source, Inc., Product Bulletin, Oct. 2006, 1 page.
Author Unknown, Near Infrared Absorption and Fluorescent Dye ADS780HO, American Dye Source, Inc., Product Information, May 2001, 1 page.
Author Unknown, Solvent Soluble Near Infrared Dye ADS798SM, American Dye Source, Inc., Product Information, Jun. 2010, 1 page.
Author Unknown, Near Infrared Laser Dye for Printing Applications ADS800AT, American Dye Source, Inc., Product Bulletin, Oct. 2006, 1 page.
Author Unknown, Near Infrared Laser Dye for Printing Applications ADS815EI, American Dye Source, Inc., Product Bulletin, Oct. 2006, 1 page.
Beverina et al., "Squaraine Compounds: Tailored Design and Synthesis towards a Variety of Material Science Applications", Eur. J. Org. Chem., 2010, pp. 1207-1225.
Tatarets et al., Dicyanomethylene Squarylium Dyes Red and Near-infrared Fluorescent Probes for Proteins and Cells, PRLS_31, SETA BioMedicals, poster, 1 page.
Vitek et al., Aldrichimica acta, vol. 1, No. 2, 1968, published by the Aldrich Chemical Company, Inc., pp. 1-9.
Yagi et al., "Squaiylium Dyes and Related Compounds", Top Heterocycl Chem, 14, Apr. 2008, pp. 133-181.
Banning et al., "Colorant Compounds", U.S. Appl. No. 14/011,762, filed Aug. 28, 2013.
Banning et al., "Phase Change Inks", U.S. Appl. No. 14/011,763, filed Aug. 28, 2013.

* cited by examiner

PHASE CHANGE INKS CONTAINING WAX-SOLUBLE NEAR-INFRARED DYES

BACKGROUND

Embodiments herein relate generally to phase change ink compositions containing waxes and wax-soluble near-infrared (NIR) dyes, NIR prints made with such phase change ink compositions, and methods of producing a layer of such a phase change ink composition on the surface of a substrate. Some embodiments concern perimidine-squaric acid-based NIR dyes for hot-melt/phase change ink formulations.

Infrared (IR)/near-infrared (NIR) sensors and associated IR/NIR absorptive inks have been developed for tracking and authenticating a number of different objects. More specifically, labels, barcodes, or other identifiable markings formed from IR/NIR absorptive inks can be formed on the surface of a number of objects. Once marked, objects can be illuminated with IR/NIR light and examined by an infrared sensor to authenticate or track the object.

Some known IR/NIR dyes have visible color associated with them, causing the resulting dye-based IR/NIR inks and the printed matter to be visibly colored. Additionally, dye-based IR/NIR inks can have limited solubility in an ink base and low light fastness and environmental fastness (e.g., air, water, humidity, and thermal fastness). For example, pigmented IR/NIR absorptive inks can include carbon black as the IR/NIR absorptive material, resulting in a dark and highly visible ink. Consequently, some of the tracking and authentication effectiveness of the IR/NIR absorptive ink can be compromised.

In general, phase change inks (sometimes referred to as "hot melt inks") are in the solid phase at ambient temperature, but exist in a liquid phase at the elevated operating temperature of an ink jet printing device. At the jet operating temperature, droplets of molten liquid ink are ejected from the printing device and, when the ink droplets contact the surface of the printing media, they quickly solidify to form a predetermined pattern of solidified ink drops. Phase change inks for color printing generally comprise a phase change ink carrier composition, which is combined with a phase change ink compatible colorant or dye. Phase change inks often contain waxes, such as polyethylene wax.

Phase change inks are desirable for ink jet printers because they remain in a solid phase at room temperature during shipping, long-term storage, and the like. Also, the problems associated with nozzle clogging due to ink evaporation related to other types of ink jet inks are largely eliminated, thereby improving the reliability of printing. Furthermore, in phase change ink jet printers where the ink droplets are applied directly onto the printing medium, the droplets can solidify immediately upon contact with the substrate. Thus, migration of ink along the printing medium is prevented and dot quality can be improved.

Phase change inks containing NIR inks would be useful for data coding and marking. Phase change ink formulations require thermally stable and wax-soluble dyes (NIR in this case) for use in the solid ink printers that operate with print-head temperatures of 110° C.-135° C. and higher.

SUMMARY

Certain embodiments are drawn to phase change ink compositions having a phase change carrier composition and a wax-soluble near-infrared (NIR) dye. The phase change carrier composition contains a wax. The wax-soluble NIR dye has an absorption maximum in the wavelength region from about 700 nm to about 1400 nm.

The wax-soluble NIR dye can be represented by formula (I), (II), (III), or (IV) a tautomer thereof, or a salt thereof. Formulas (I), (II), (III), and (IV) are

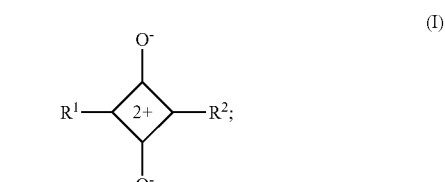

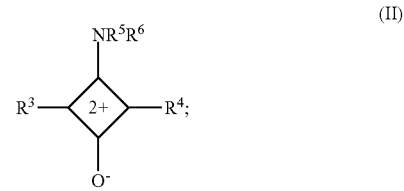

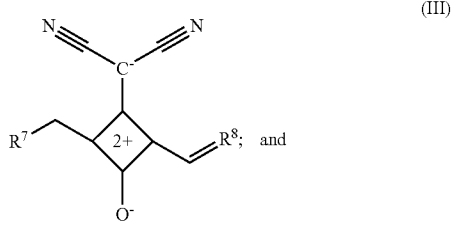

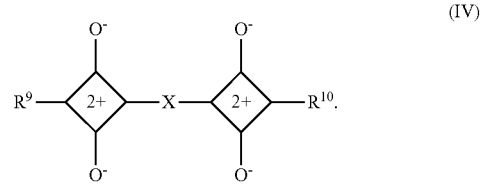

Each of $R^1$, $R^2$, $R^3$, $R^4$, $R^7$, $R^8$, $R^9$, and $R^{10}$ is independently a cyclic group-containing residue that contains at least one of (a) a substituted or unsubstituted heterocyclic group comprising at least one of N, S, and O; (b) a substituted or unsubstituted cycloalkyl group; (c) a substituted or unsubstituted aryl group; and (d) a substituted or unsubstituted aralkyl group. Each of $R^1$, $R^2$, $R^3$, $R^4$, $R^7$, $R^8$, $R^9$, and $R^{10}$ has between about 10 and about 150 carbon atoms. Each of $R^5$ and $R^6$ is independently H or an alkyl group having from 1 to 6 carbon atoms. X is

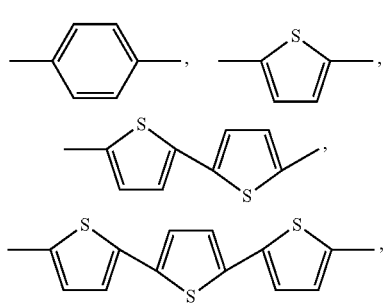

-continued

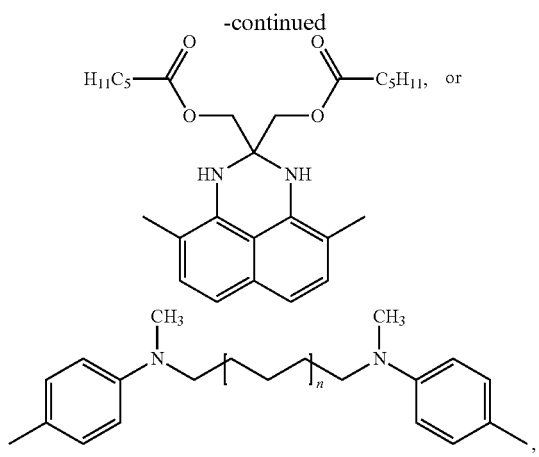

and
n is 1 to 5.

Some embodiments are drawn to near-infrared prints having a substrate and a phase change ink composition on a surface of the substrate. The phase change ink composition has a phase change carrier composition and a wax-soluble near-infrared (NIR) dye having an absorption maximum in the wavelength region from about 700 nm to about 1400 nm. The phase change carrier composition contains a wax. The wax-soluble NIR dye can be represented by formula (I), (II), (III), or (IV) a tautomer thereof, or a salt thereof, as described herein.

Certain embodiments are drawn to methods for producing a layer of a phase change ink on the surface of a substrate. The methods include using in a printing apparatus a phase change ink composition in the solid phase. The phase change ink composition contains an admixture of (a) a phase change carrier composition and (b) a wax-soluble near-infrared (NIR) dye having an absorption maximum in the wavelength region from about 700 nm to about 1400 nm. The phase change carrier composition contains (i) a urethane resin that is the reaction product of at least one first alcohol and a first isocyanate; and/or (ii) a urethane/urea resin that is the reaction product of at least one second alcohol, a second isocyanate and at least one monoamine; and (iii) at least one monoamide; and (iv) at least one polyethylene wax. The methods include applying the phase change composition in a desired pattern to an intermediate transfer surface, and transferring the desired pattern of the phase change ink composition to the surface of the substrate. The wax-soluble NIR dye can be represented by formula (I), (II), (III), or (IV) a tautomer thereof, or a salt thereof, as described herein.

BRIEF DESCRIPTION OF THE DRAWINGS

The accompanying drawings, which are incorporated in and constitute a part of this specification, illustrate embodiments of the present teachings and together with the description, serve to explain the principles of the present disclosure.

DETAILED DESCRIPTION

Figure 1:
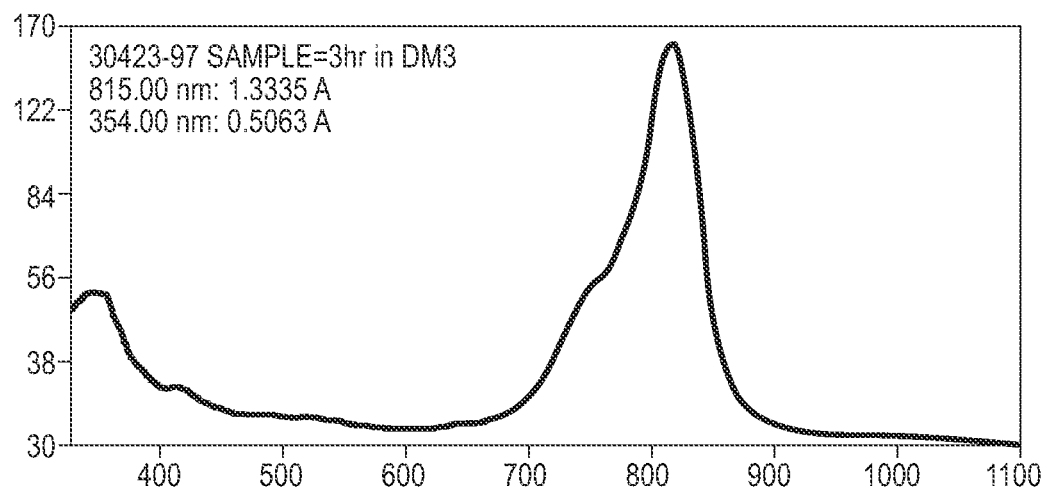
FIG. 1 shows absorbance of a squaric acid near-infrared absorbing dye of embodiments at various wavelengths.

Certain embodiments are drawn to phase change ink compositions comprising (a) a phase change carrier composition comprising a wax and (b) a wax-soluble near-infrared (NIR) dye having an absorption maximum in the wavelength region from about 700 nm to about 1400 nm. In some embodiments, the wax-soluble NIR dye can have an absorption maximum wavelength between about 700 nm to about 900 nm; about 700 to about 850 nm; or about 750 nm to about 900 nm.

In some embodiments the phase change ink compositions can comprise between about 0.01 wt % and about 20 wt %; about 1.0 wt % and about 10 wt %; or about 2.0 wt % and about 5 wt % of the wax-soluble NIR dye relative to the total weight of the phase change ink composition. In some embodiments, the wax-soluble NIR dye can be "invisible" in the visible spectrum (i.e., the wax-soluble NIR dye does not absorb visible light having a wavelength of between about 400 nm and about 700 nm. In certain embodiments, UV absorption of the wax-soluble NIR dye may tail into the visible spectrum (i.e., at about 400 nm) and the NIR absorption may tail into the visible spectrum. In some embodiments, the wax-soluble NIR dye can have an absorption maximum wavelength between about 700 nm to about 1400 nm; about 700 nm to about 900 nm; about 700 to about 850 nm; or about 750 nm to about 900 nm.

In some embodiments the wax-soluble NIR dye can be represented by formula (I), (II), (III), or (IV) a tautomer thereof, or a salt thereof, wherein formulas (I), (II), (III), and (IV) are

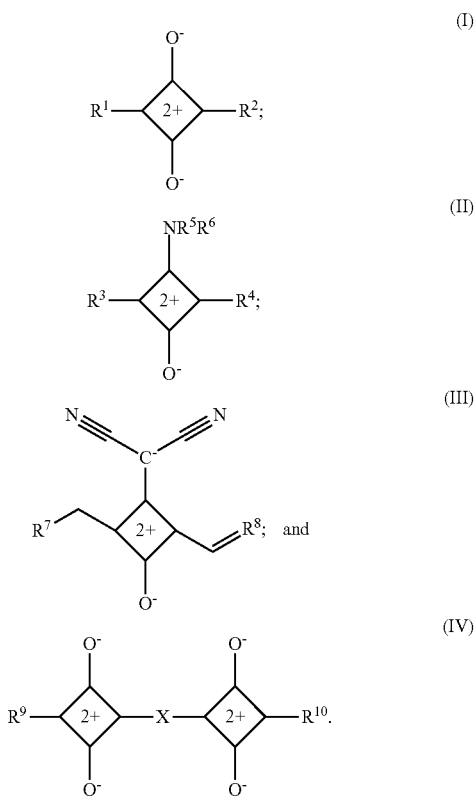

Each of $R^1$, $R^2$, $R^3$, $R^4$, $R^7$, $R^8$, $R^9$ and $R^{10}$ is independently a cyclic group-containing residue comprising at least one cyclic group selected from the group consisting of (a) a substituted or unsubstituted heterocyclic group comprising at least one of N, S, and O; (b) a substituted or unsubstituted cycloalkyl group; (c) a substituted or unsubstituted aryl group; and (d) a substituted or unsubstituted aralkyl group; and each of $R^1$, $R^2$, $R^3$, $R^4$, $R^7$, $R^8$, $R^9$ and $R^{10}$ can comprise between about 10 and about 150 carbon atoms, between about 20 and about 120 carbon atoms, or between about 30 and about 100 carbon atoms. The cyclic group-containing residues can be monocyclic group-containing residues or polycyclic group-containing residues. In some embodiments each of $R^1$, $R^2$, $R^3$, $R^4$, $R^7$, $R^8$, $R^9$ and $R^{10}$ can comprise a substituted or unsubstituted perimidine group. In some embodiments $R^1$, $R^2$, $R^3$, $R^4$, $R^7$, $R^8$, $R^9$ and $R^{10}$ can comprise at least one linear alkyl group having from 5 to 50 carbon atoms, 5 to 30 carbon atoms, or 5 to 20 carbon atoms in addition to the cyclic group of the cyclic group-containing residue. In certain embodiments the linear alkyl group can be a substituent of a cyclic group of the cyclic group-containing residue.

In some embodiments, X in formula (IV) can be

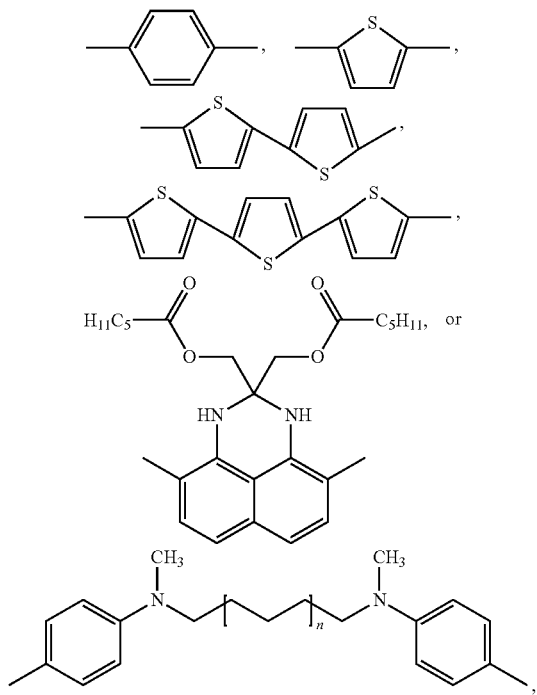

wherein n is 1 to 5. In some embodiments n is 2.

It will be readily appreciated that the dyes of formulas (I), (II), (III), and (IV) (and formulas (V), (VI), (VII), (VIII) and (IX) discussed below) may be represented by a number of different resonance structures, reflecting the many different ways in which the delocalized π-electron system may be visualized and notated. For example, in formula (I) and elsewhere in this specification, the moiety:

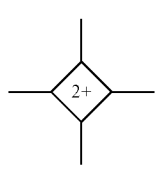

represents the aromatic dication derived from cyclobutadiene. This particular notation is chosen for convenience, and allows both the end groups and the central portion of the dye molecule to be depicted in full aromatized form. It must be emphasized, however, that formulas are to be interpreted as including all the possible resonance forms. Thus, for example formula (I) includes the resonance form:

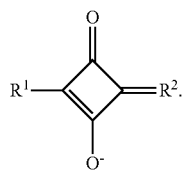

Herein, the various resonance forms are included for the wax-soluble NIR dyes regardless of the π-electron system notated in formulas (I), (II), (III), (IV), (V), (VI), (VII), (VIII), and (IX).

In some embodiments each of $R^1$ and $R^2$ can be independently selected from the group consisting of

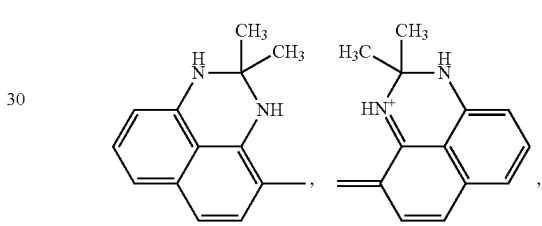

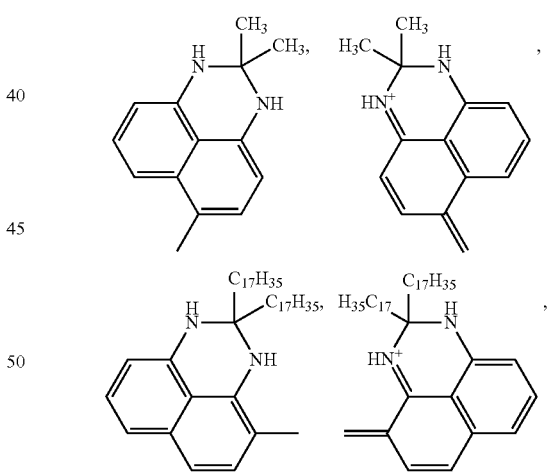

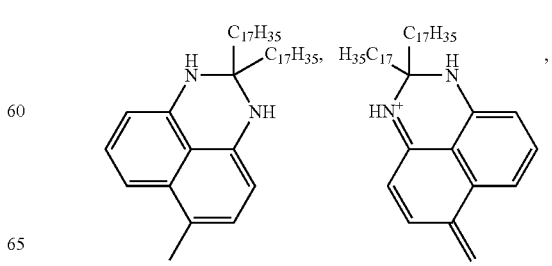

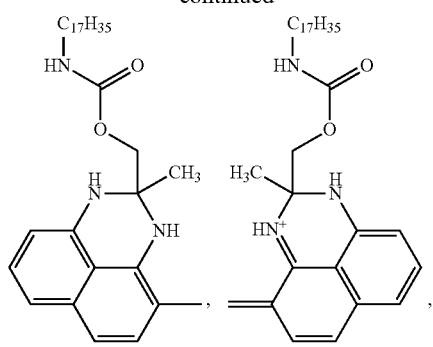
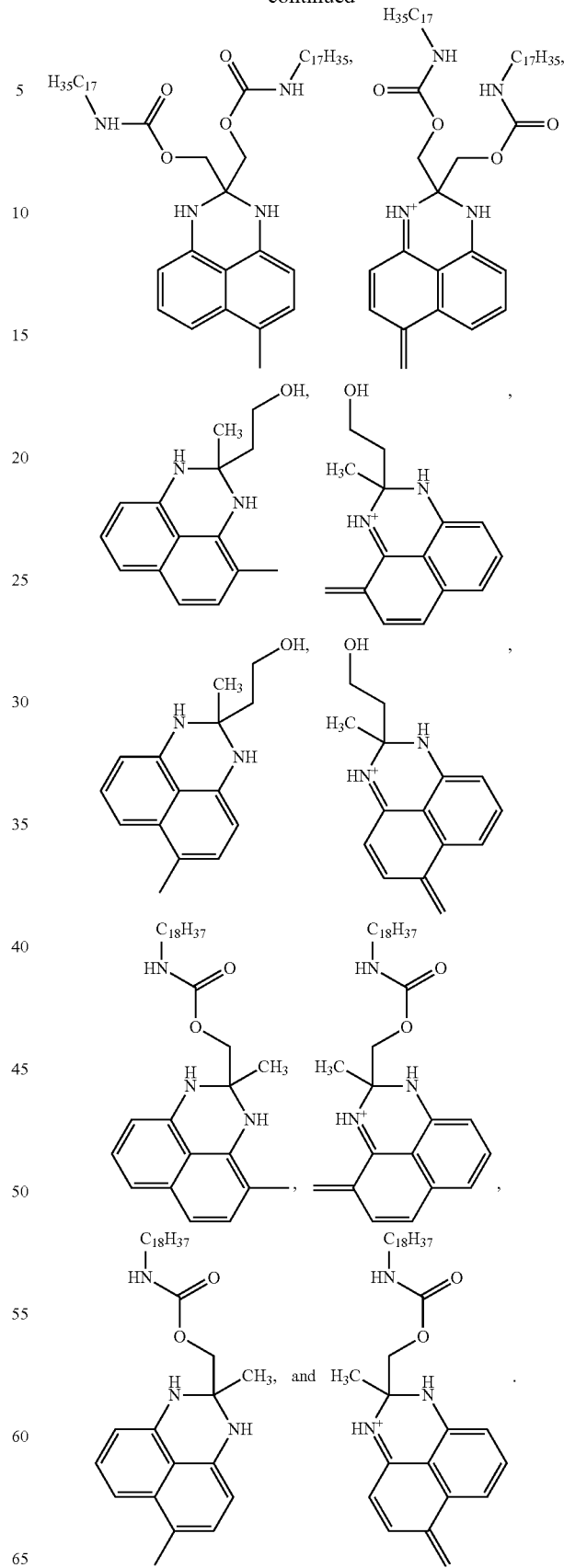

In embodiments each of $R^3$ and $R^4$ can independently be selected from the group consisting of

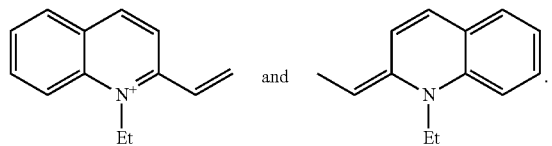

In some embodiments, each of $R^7$ and $R^8$ can independently be selected from the group consisting of

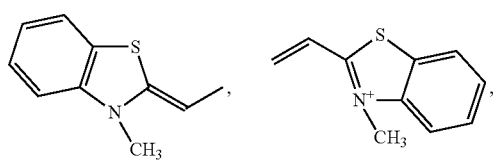

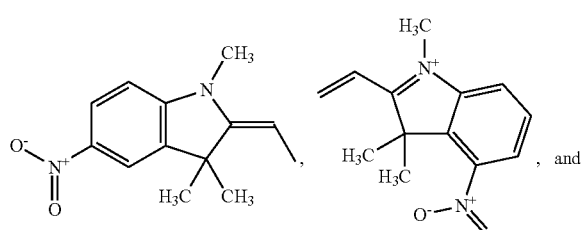

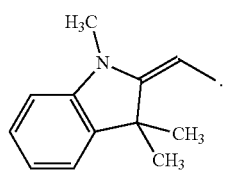

In certain embodiments each of $R^1$ and $R^2$ can independently comprise a substituted or unsubstituted squaric acid moiety, in addition to the cyclic group selected from the group consisting of (a) a substituted or unsubstituted heterocyclic group comprising at least one of N, S, and O; (b) a substituted or unsubstituted cycloalkyl group; (c) a substituted or unsubstituted aryl group; and (d) a substituted or unsubstituted aralkyl group.

In some embodiments, each of $R^9$ and $R^{19}$ can independently be selected from the group consisting of

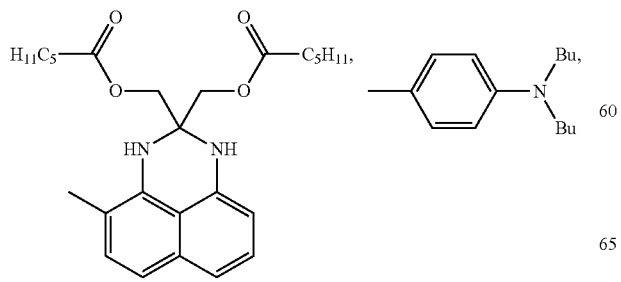

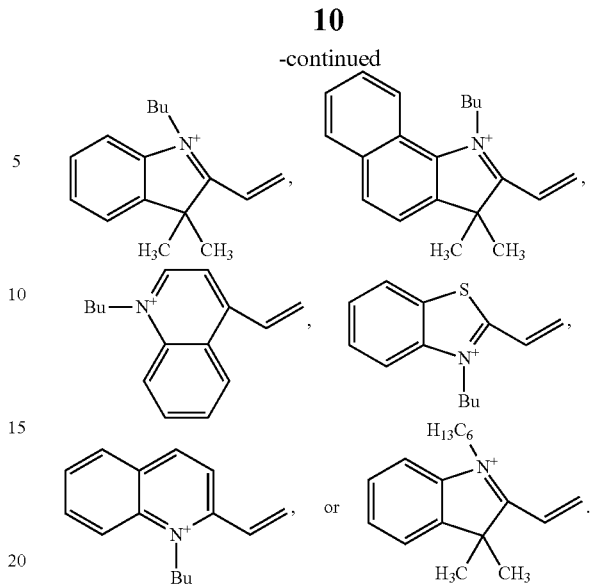

Each of $R^5$ and $R^6$ can be independently selected from H and alkyl groups having from 1 to 6 carbon atoms. In some embodiments $R^5$ and $R^6$ can be independently selected from H and methyl or ethyl groups.

Examples of wax-soluble NIR dyes (Examples 7-74), which can be used in some embodiments appear in Tables 1 and 2 below.

In certain embodiments the wax-soluble NIR dye can be a squarylium dye represented by formula (I) and $R^1$ and $R^2$ can be independently selected from substituted and unsubstituted perimidine groups. In some embodiments the perimidine groups can be dimethyl substituted. A linkage from the squaric acid moiety to each of $R^1$ and $R^2$ can be in either in the ortho or para position of the perimidine group.

In some embodiments the wax-soluble NIR dye can be represented by formula (V), a tautomer thereof, or a salt thereof, wherein formula (V) is

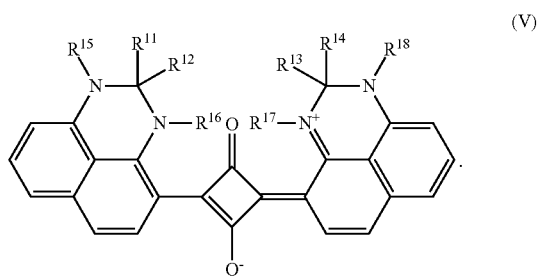

Each of $R^{11}$, $R^{12}$, $R^{13}$, and $R^{14}$ can be independently selected from the group consisting of an alkyl group having 1 to 20 carbon atoms,
an alkoxy group having 2 to 20 carbon atoms,
a cycloalkyl group having 3 to 20 carbon atoms,
an aryl group having 6 to 14 carbon atoms,
an aralkyl group having 7 to 15 carbon atoms,

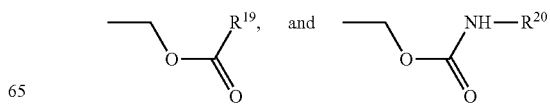

$R^{19}$ and $R^{20}$ can be independently selected from the group consisting of an alkyl group having 1 to 50 carbon atoms and a cycloalkyl group having 3 to 20 carbon atoms. $R^{15}$, $R^{16}$, $R^{17}$, and $R^{18}$ can be independently selected from the group consisting of hydrogen, an alkyl group having 1 to 20 carbon atoms, a cycloalkyl group having 3 to 20 carbon atoms, and an aryl group having from 6 to 14 carbon atoms.

In certain embodiments the wax-soluble NIR dye can be represented by the formula (VI), (VII), (VIII), or (IX) a tautomer thereof, or a salt thereof, wherein formulas (VI), (VII), (VIII), and (IX) are

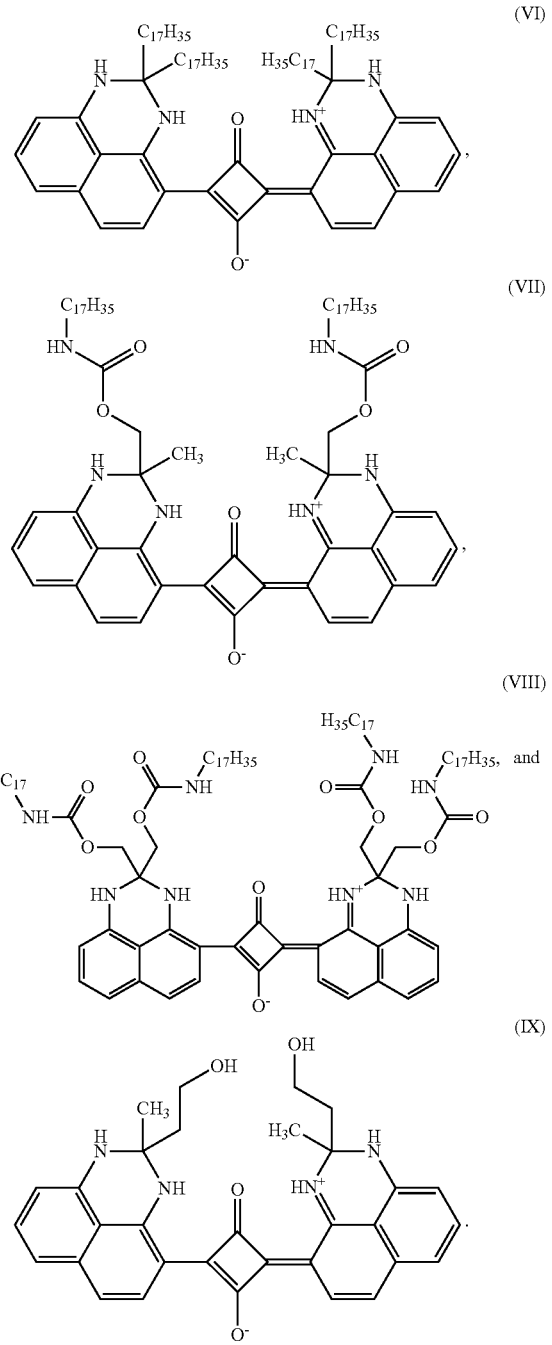

The phase change ink compositions of embodiments comprise a phase change carrier composition comprising a wax. In some embodiments the wax can be a polyethylene wax having a molecular weight between about 200 Da and about 5,000 Da, between about 500 Da and about 2000 Da; or between about 600 Da and about 1000 Da.

In some embodiments the wax can be Polywax™ 655 Polyethylene, obtained from Baker Petrolite, Tulsa, Okla., of the formula $CH_3(CH_2)_{50}CH_3$. In embodiments, the wax can be a tetra-amide wax/resin obtained from reaction of one equivalent of a C-36 dimer acid, two equivalents of ethylene diamine and two equivalents UNICID® 700 as described in Example 1 of U.S. Pat. No. 6,174,937. In some embodiments, the wax can be a tri-amide wax obtained from reaction of one equivalent of a triamine Jeffamine T-403) and three equivalents UNICID® 550 as described in Example 2 of U.S. Pat. No. 6,860,930. The contents of U.S. Pat. Nos. 6,174,937 and 6,860,930 are hereby incorporated by reference in their entirety. In certain embodiments, the wax can be stearyl stearamide.

In some embodiments, the phase change ink compositions can comprise between about 0.1 wt % and about 80 wt %; about 10 wt % and about 60 wt %; or about 30 wt % and about 50 wt % of the wax relative to the total weight of the phase change ink composition.

The phase change ink compositions comprise a phase change carrier composition. Phase change carrier compositions are known in the art and known phase change carrier compositions can be used in certain embodiments. In some embodiments, the phase change carrier composition can be invisible, as described above. In some embodiments, the phase change carrier composition can comprise: (a) a urethane resin that is the reaction product of the reaction of at least one first alcohol and a first isocyanate, the alcohol being selected from the group consisting of hydroabietyl alcohol, octyphenol ethoxylate, and octadecyl alcohol; and/or (b) a mixed urethane/urea resin that is the reaction product of at least one second alcohol, a second isocyanate, and at least one monoamine; and (c) at least one monoamide; and (d) at least one polyethylene wax. In certain embodiments, the second alcohol can be selected from the group consisting of hydroabietyl alcohol, octylphenol ethoxylate and octadecyl alcohol. In some embodiments, the second isocyanate can be selected from the group consisting of a monoisocyanate, a diisocyanate, a triisocyanate, a copolymer of a diisocyanate, and a copolymer of a triisocyanate. The second isocyanate can be isophorone diisocyanate in certain embodiments. The monoamine can be selected from the group consisting of an aliphatic monoamine, an aromatic monoamine, an aliphatic/aromatic monoamine, a fused ring system monoamine, and a hydroxyl/amino containing compound. The monoamine can be octadecyl amine in some embodiments. In certain embodiments, the monoamide can be stearyl stearamide (such as, KEMAMIDE® S-180 (N-octadecylstearamide), obtained from Crompton Corp., Greenwich, Conn.). The phase change carrier composition can be as described in U.S. Pat. No. 5,782,966, for example.

Compositions suitable for use as phase change ink carrier compositions are known. Examples of suitable phase change ink carrier compositions include those disclosed at Example 1 of U.S. Pat. No. 8,057,589 and Examples A, B, C and 1 of U.S. Pat. No. 7,381,255, the disclosures of each of which are hereby incorporated by reference in their entirety. Some representative examples of other references disclosing such materials include U.S. Pat. Nos. 7,901,496; 7,811,368; 7,749,315; 7,713,342; 7,658,486; 7,407,539; 7,381,254; 7,377,971; 7,311,767; 7,211,131; 7,033,424; 6,878,198; 6,858,070; 6,821,327; 6,730,150; 3,653,932, 4,390,369, 4,484,948, 4,684,956, 4,851,045, 4,889,560, 5,006,170, 5,151,120, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Some embodiments are drawn to near-infrared (NIR) prints comprising a substrate and a phase change ink composition disposed on a surface of the substrate. The phase change ink composition comprises a phase change carrier composition comprising a wax and a wax-soluble near-infrared (NIR) dye as described above. The wax-soluble NIR dye can have an absorption maximum in the wavelength region from about 700 nm to about 1400 nm. In some embodiments, the wax-soluble NIR dye can have an absorption maximum wavelength between about 700 nm to about 900 nm; about 700 to about 850 nm; or about 750 nm to about 900 nm.

In embodiments NIR prints can be prepared by a method comprising:
(1) providing an admixture of (a) the phase change carrier composition; and (b) the wax-soluble NIR dye;
(2) transferring the solid phase, phase change ink composition to a phase change ink applicator;
(3) raising the operating temperature of the applicator to a level whereby a liquid phase, phase change ink composition is formed;
(4) providing the substrate in proximity to the applicator;
(5) applying a predetermined pattern of the liquid phase, phase change ink composition to the surface of the substrate; and
(6) lowering the temperature of the applied ink composition to form a solid phase, phase change ink pattern on the substrate.

The nature of the substrate is not critical and includes, for example, paper, plastic, glass, metal plates, etc. The applicator can be an ink jet printhead. The wax-soluble NIR dye can be represented by formula (I), (II), (III), (IV), (V), (VI), (VII), (VIII), or (IX) a tautomer thereof, or a salt thereof, as described herein.

Certain embodiments are drawn to methods for producing a layer of a phase change ink on the surface of a substrate, which comprises:
(1) employing in a printing apparatus a phase change ink composition in the solid phase comprising an admixture of (a) a phase change carrier composition and (b) a wax-soluble near-infrared (NIR) dye having an absorption maximum in the wavelength region from about 700 nm to about 1400 nm;
wherein the phase change carrier composition comprises (i) a urethane resin that is the reaction product of at least one first alcohol and a first isocyanate; and/or (ii) a urethane/urea resin that is the reaction product of at least one second alcohol, a second isocyanate and at least one monoamine; and (iii) at least one monoamide; and (iv) at least one polyethylene wax;
(2) optionally, applying the phase change composition in a desired pattern to an intermediate transfer surface;
(3) transferring the desired pattern of the phase change ink composition to the surface of the substrate.

The nature of the substrate is not critical and includes, for example, paper, plastic, glass, metal plates, etc. The wax-soluble NIR dye can be represented by formula (I), (II), (III), (IV), (V), (VI), (VII), (VIII), or (IX) a tautomer thereof, or a salt thereof, as described herein.

In some embodiments the phase change ink compositions can be applied to the surface of a substrate using a solid inkjet (SIJ) printer (such as, the "Phaser" series from Xerox), and operate using a heated piezoelectric printhead.

Phase change ink compositions of embodiments can be used in security applications (Ink indentification, barcodes, etc.) as well as IR leveling applications—where IR radiation can be applied to an ink droplet and cause it to flow/spread.

Methods of synthesizing of certain NIR dyes are known in the art can be used in embodiments. Examples of methods of synthesizing for wax-soluble NIR dyes of some embodiments are disclosed below.

Single Step Approach

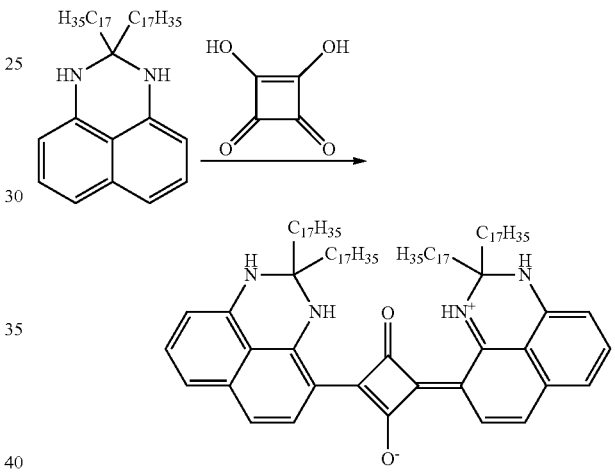

Two Step—Hydroxyl Converted to Urethane Approach

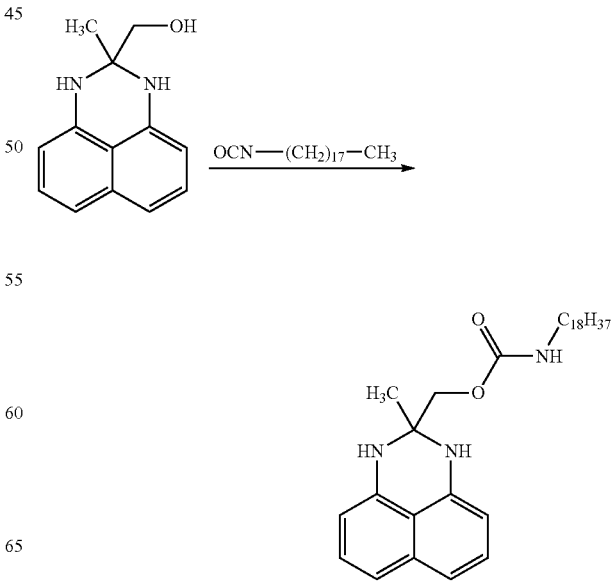

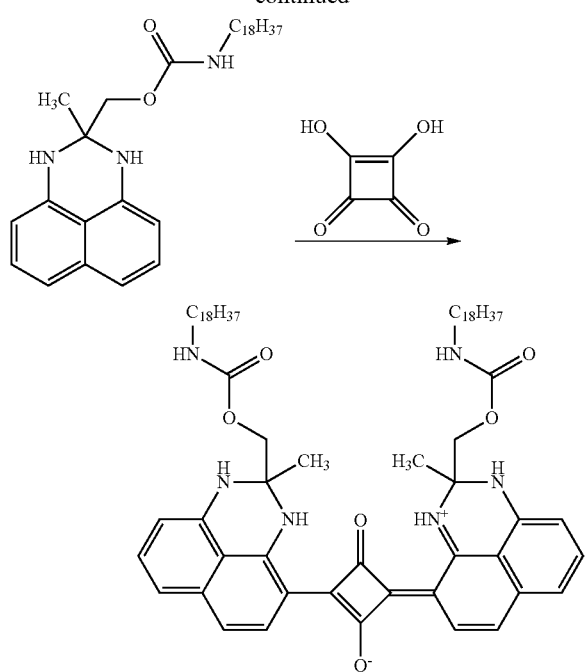

Two Step—Hydroxyl Converted to Ester Approach

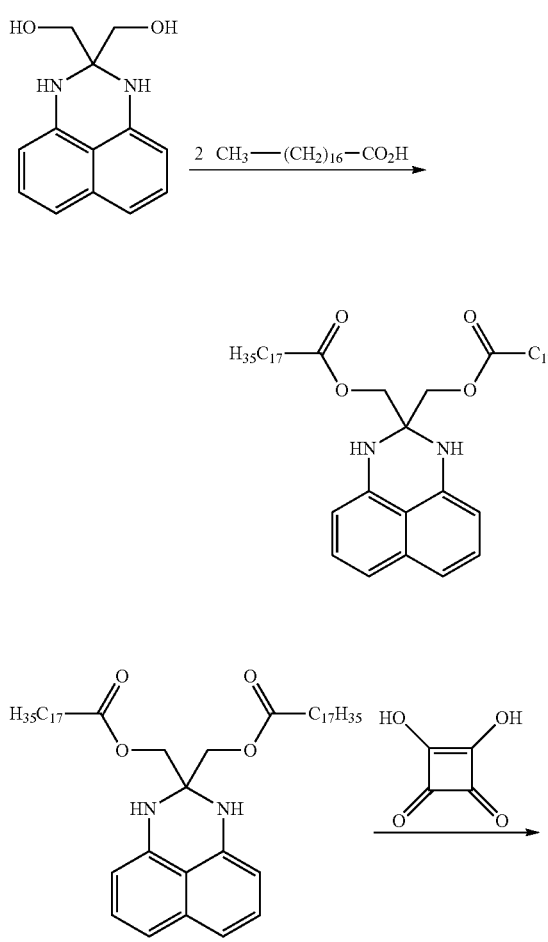

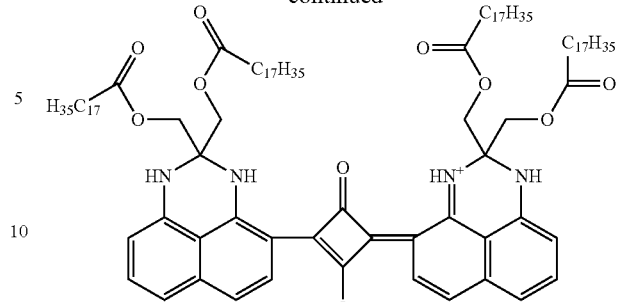

Employing stearone (rather than acetone (as the source of the dimethyl substitution)) in reactions to produce a wax-soluble NIR dye can render perimidine based NIR absorbing—squaric acid based dyes, wax soluble for use in some embodiments.

The following Examples further define and describe embodiments herein. Unless otherwise indicated, all parts and percentages are by weight.

EXAMPLES

Example 1

Preparation of Squaric Acid Near-Infrared Absorbing Dye

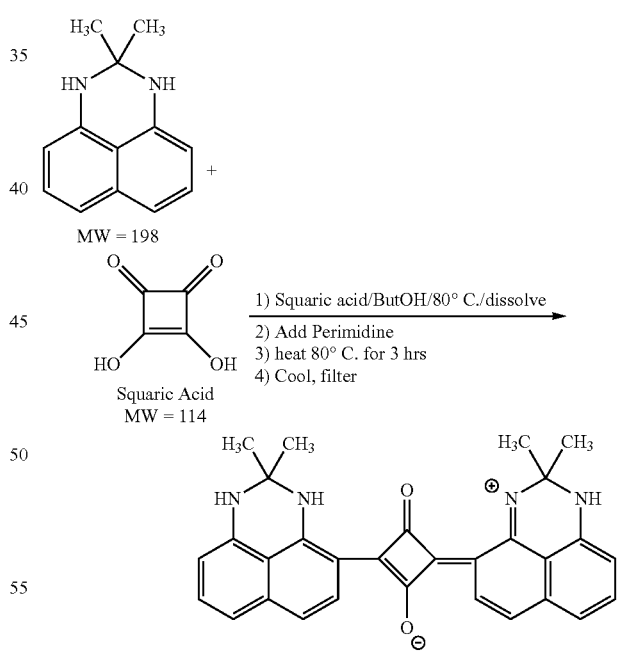

Max absorbance is at 820 nm in DMF.

A 100 ml round bottom flask equipped with a Teflon® coated stir magnet and a condenser was charged with 1 g squaric acid ($M_W$=114 g/mol) and 45 g butanol. The round bottom flask was placed in an 80° C. oil bath. After squaric acid was dissolved, about 4.0 g 2,2-dimethyl-2,3-dihydroperimidine ($M_W$=198) was added to the round bottom flask. The reaction progress was monitored using a UV-VIS (ultraviolet-visible) spectrophotometer. The peak area at about 815 nm grew and a peak at 354 nm decreased in area as the reaction progressed. After 3 hours the absorbance ratio at 815 nm to 353 nm reached a maximum of 2.63 (FIG. 1). The reaction mixture was cooled in ice after 4.5 hours. The solids were filtered and rinsed with methanol. The structure of the reaction product was

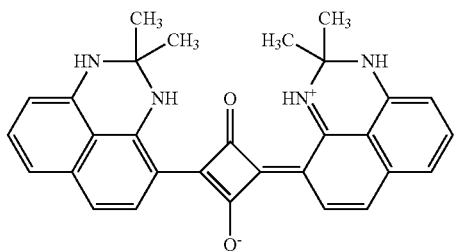 [SMILES: CC1(C)Nc2cccc3ccc(C4=C([O-])/C(=c5\ccc6cccc7c6c5=[NH+]C(C)(C)N7)C4=O)c(c23)N1]

Example 2

Preparation of Squaric Acid/Distearylperimidine NIR Absorbing Dye

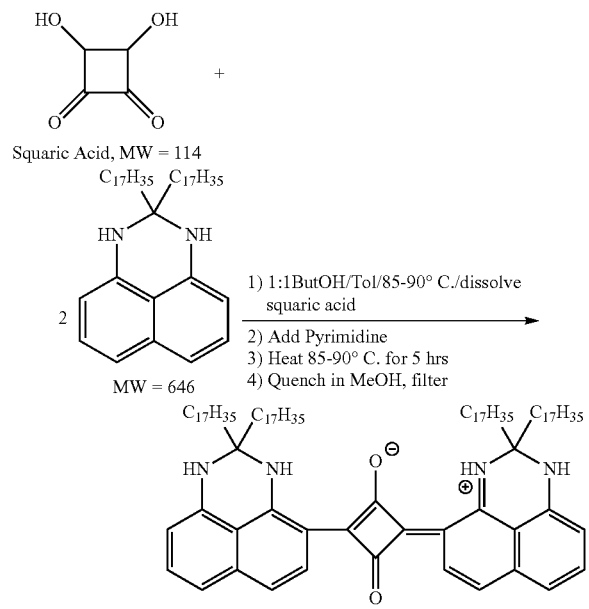

Figure 2:
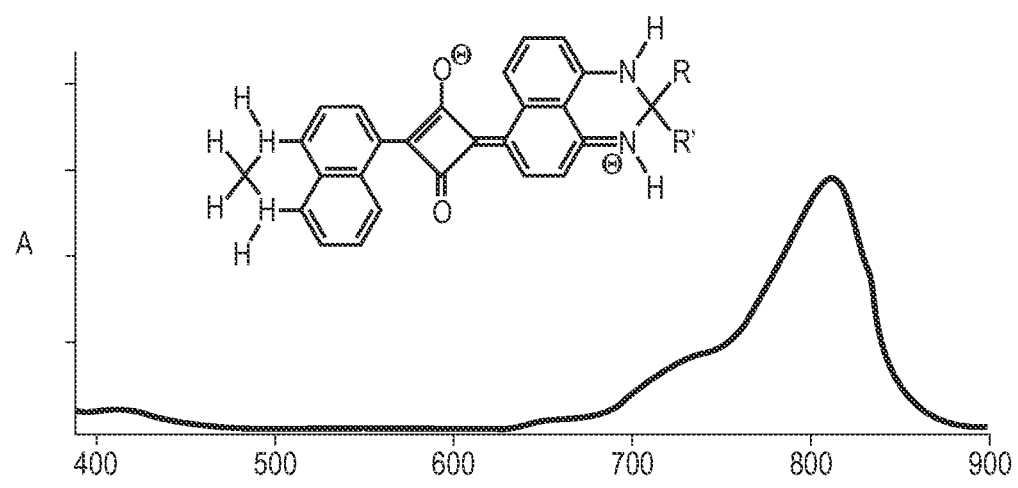
FIG. 2 shows absorbance of a squaric acid/distearylperimidine near-infrared absorbing dye of embodiments at various wavelengths.

To a 100 ml round bottom flask equipped with a Teflon® coated stir magnetic and a condenser was charged with 2.0 g squaric acid ($M_W$=114), 50 g toluene and 50 g butanol. The round bottom flask was placed in an 80° C. to 90° C. oil bath. After squaric acid was dissolved, 22.3 g of perimidine compound ($M_W$=646) was added to the round bottom flask. The reaction progress was monitored by UV-VIS spectroscopy. The peak area at about 811 nm grew and a peak at 355 nm decreased in area as the reaction progressed (FIG. 2). After 3.5 hours the absorbance ratio at 811 nm to 355 nm reached a maximum of 11.62. The reaction mixture was quenched in about 400 ml methanol after 5 hours of reaction. Sticky solids were precipitated, filtered and rinsed with additional methanol three times. The sticky solids were dissolved in THF (tetrahydrofuran) and subsequently dried.

The yield of the product was about 78% E=70211 mIA/g at 811 nm in toluene. The structure of the reaction product was

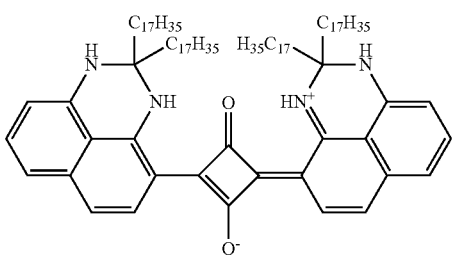

Example 3

Preparation of Squaric Acid/Hydroxymethylperimidine NIR Absorbing Dye

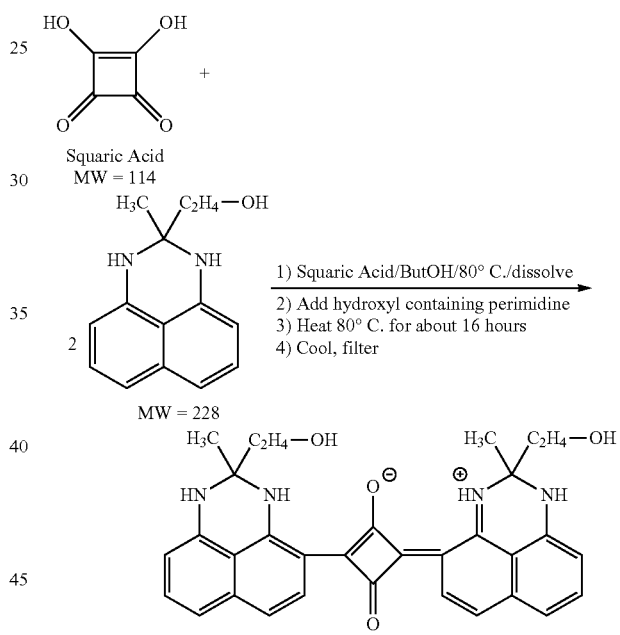

Figure 3:
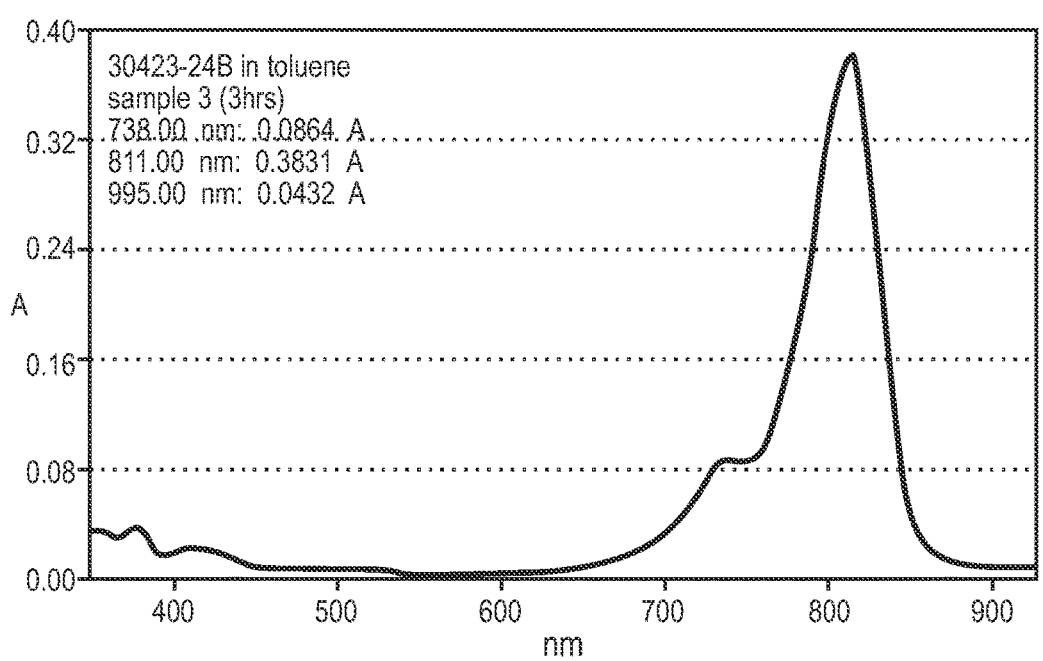
FIG. 3 shows absorbance of a squaric acid/hydroxymethylperimidine near-infrared absorbing dye of embodiments at various wavelengths.

To a 100 ml round bottom flask equipped with a Teflon® coated stir magnetic and a condenser was charged with 1 g squaric acid ($M_W$=114) and 45 g butanol. The round bottom flask was placed in an 80° C. oil bath. After the squaric acid was dissolved 4.0 g 1H-perimidine-2,3-dihydro-2-methyl-2-ethanol ($M_W$=228) was added to the round bottom flask. The reaction progress was monitored using a UV-VIS spectrophotometer. The peak area at about 812 nm grew and a peak at 354 nm decreased in area as the reaction progressed. The reaction was stopped when the 812 nm peak was maximized (FIG. 3).

Example 4

Preparation of Colorless Phase Change Carrier Composition

An ink base/phase change carrier composition was prepared by melting, admixing, and filtering the following ingredients:

(a) polyethylene wax (Polywax™ 655 polyethylene, obtained from Baker Petrolite, Tulsa, Okla., of the formula $CH_3(CH_2)_{50}CH_3$) 43.59 parts by weight;
(b) stearyl stearamide wax (KEMAMIDE® S-180 (N-octadecylstearamide), obtained from Crompton Corporation, Greenwich, Conn.) 19.08 parts by weight;
(c) tetra-amide resin obtained from the reaction of one equivalent of a C-36 dimer acid obtained from Uniqema, New Castle, Del. with two equivalents of ethylene diamine and 2 equivalents of UNICID® 700 (long chain, linear primary carboxylic acid; melting point 110° C., penetration of 3 dmm at 25° C.; viscosity of 12 cps at 149° C.; acid number 63 mg KOH/g sample) (obtained from Baker Petrolite, Tulsa, Okla., a long chain hydrocarbon having a terminal carboxylic acid group), (prepared as described in Example 1 of U.S. Pat. No. 6,174,937, the entirety of which is hereby incorporated by reference) 18.94 parts by weight;
(d) urethane resin obtained from the reaction of two equivalents of ABITOL® E hydroabietyl alcohol (obtained from Hercules Inc., Wilmington, Del.) and one equivalent of isophorone diisocyanate, (prepared as described in Example 1 of U.S. Pat. No. 5,782,966, the entirety of which is hereby incorporated by reference) 11.71 parts by weight;
(e) urethane resin that is the adduct of three equivalents of stearyl isocyanate and a glycerol-based alcohol, (prepared as described in Example 4 of U.S. Pat. No. 6,309,453, the entirety of which is hereby incorporated by reference) 6.48 parts by weight; and
(f) NAUGUARD® 445 antioxidant (4,4'-di(alpha,alpha-dimethylbenzyl)diphenylamine) (available from Uniroyal Chemical Co., Middlebury, Conn.), 0.20 parts by weight.

Thereafter, 600 grams of the ink carrier components as listed above in the ratios as listed above were added to a 1 liter beaker and heated in an oven at 135° C. until molten. Subsequently, the beaker was inserted into a heating mantle set to 135° C. and the contents of the beaker were stirred for 45 minutes. The resulting ink was then filtered through a combination of Whatman® #3 and 0.2 micron NAE (nylon) filters and placed in a Mott filter assembly. Filtration was supported by the addition of 1 percent by weight FILTER-AID (Hyflo Super-Cel diatomaceous), obtained from Fluka Chemika, Switzerland, and proceeded at a temperature of 135° C. until complete after 6 hours. The ink base was poured into molds containing about 31 grams of the colorless ink base and allowed to cool.

Example 5

Preparation of NIR Phase Change Ink

About 30 grams of colorless phase change carrier composition from Example 4 was placed in a 100 mL beaker with a magnetic stir bar and subsequently placed in a 135° C. oil bath until molten. About 0.5 grams of the squaric acid/distearylperimidine NIR absorbing dye from Example 2 was then added and stirred for about 3 hours. The essentially colorless ink was then poured into an aluminum mold.

Example 6

Printing of Ink Samples Containing NIR Absorbing Dye

Using a RK Print-Coat Instruments Ltd. K-proofer, print samples of the inks from Example 5 were produced on Xerox 4200 paper. These proofs show three different thicknesses of ink coverage on the paper.

Examples 7-74 in Tables 1 and 2 below include wax-soluble NIR dyes that can be used in certain embodiments.

TABLE 1

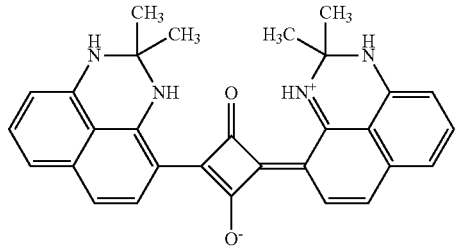 [SMILES: CC1(C)Nc2cccc3ccc(C4=C([O-])/C(=c5\ccc6cccc7c6c5=[NH+]C(C)(C)N7)C4=O)c(c23)N1]

7

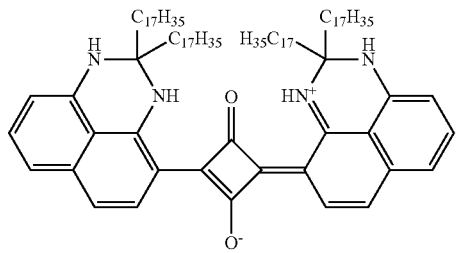

8

TABLE 1-continued
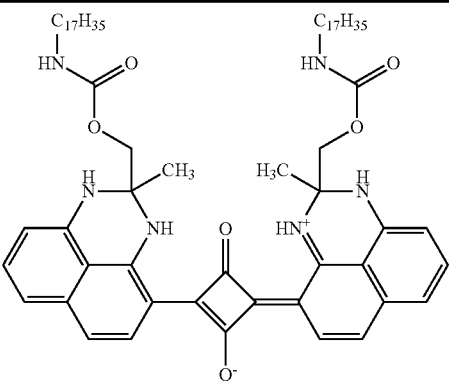
9
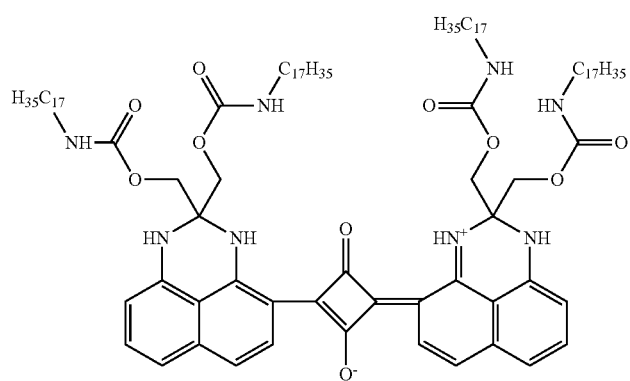
10
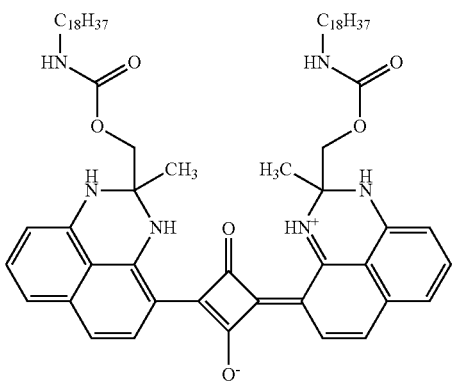
11
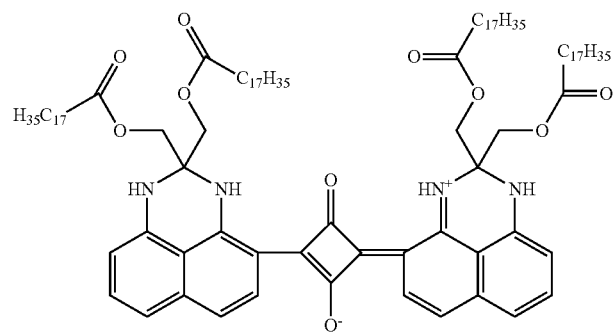
12

TABLE 1-continued
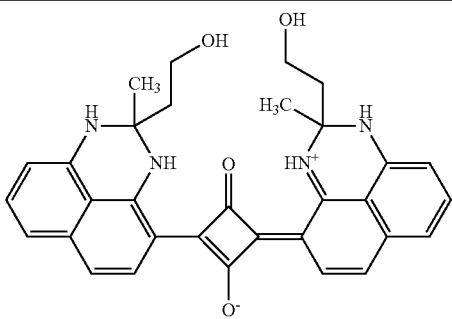
13
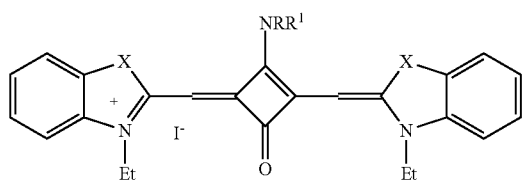
14
X is CH=CH; $R^1$ and R are Et
15
X is CH=CH; $R^1$ is H and R is Me
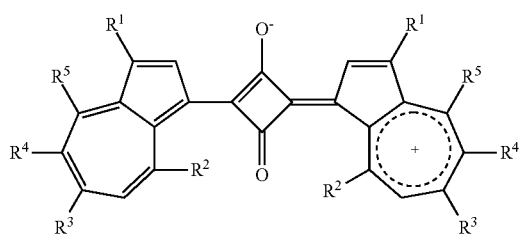
16
$R^1$, $R^2$ is Me; $R^4$ is i-Pr; $R^3$, $R^5$ is H
17
$R^1$, $R^4$ is H; $R^2$, $R^3$, $R^5$ is Me
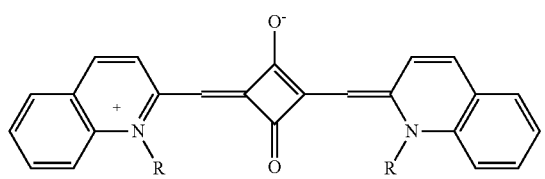
18
R is Et
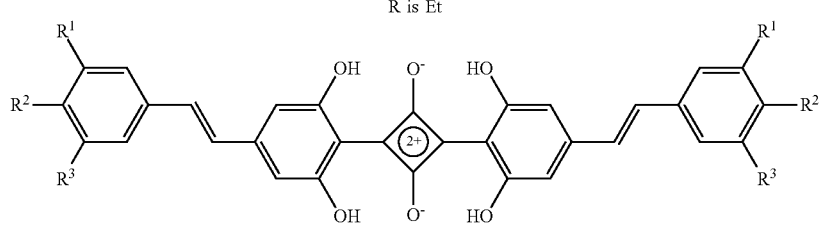
19
$R^1$ is H; $R^2$ is $OC_6H_{13}$; $R^3$ is H
20
$R^1$ is H; $R^2$ is OH; $R^3$ is H
21
$R^1$ is $OC_6H_{13}$; $R^2$ is $OC_6H_{13}$, $R^3$ is H
22
$R^1$ is $OC_6H_{13}$; $R^2$ is $OC_6H_{13}$; $R^3$ is $OC_6H_{13}$
23
$R^1$ is $OC_6H_{13}$; $R^2$ is OMe; $R^3$ is $OC_6H_{13}$ TABLE 1-continued
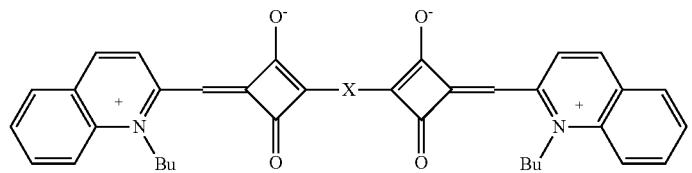
24
X is a: 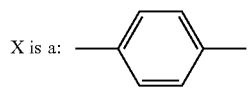
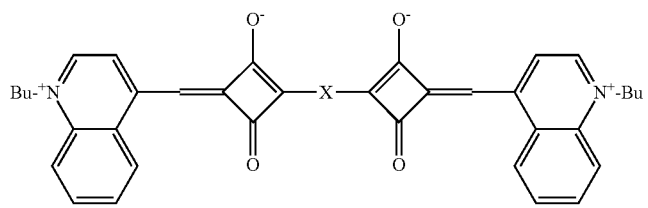
25
X is a: 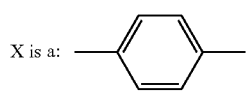
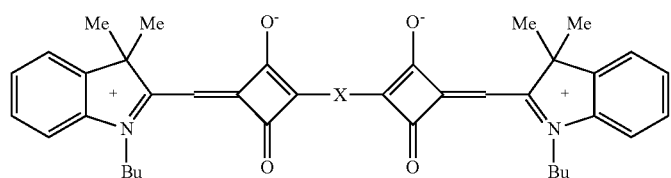
26, 27, 28
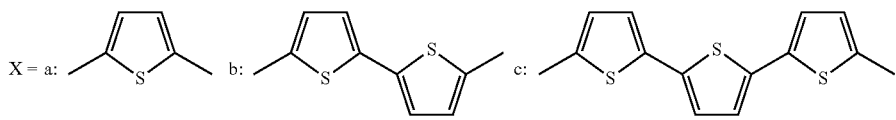
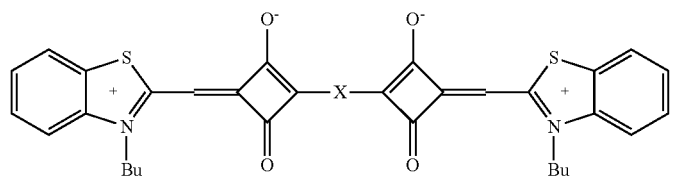
29, 30, 31
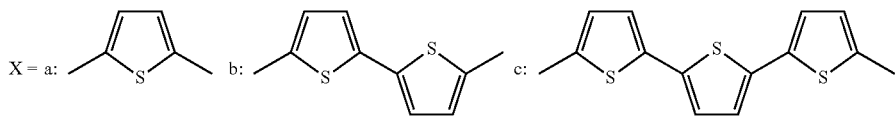

TABLE 1-continued
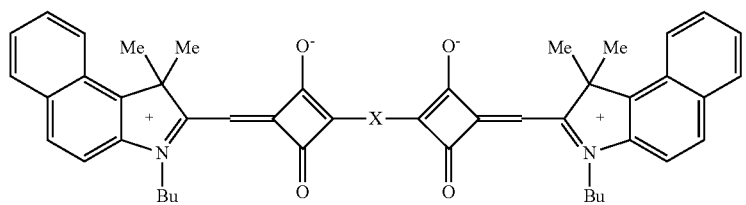
32, 33, 34
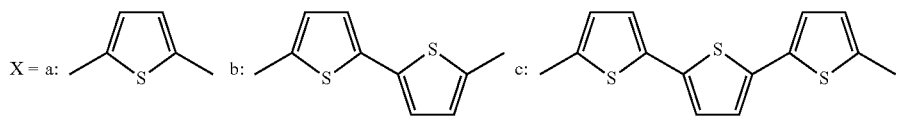
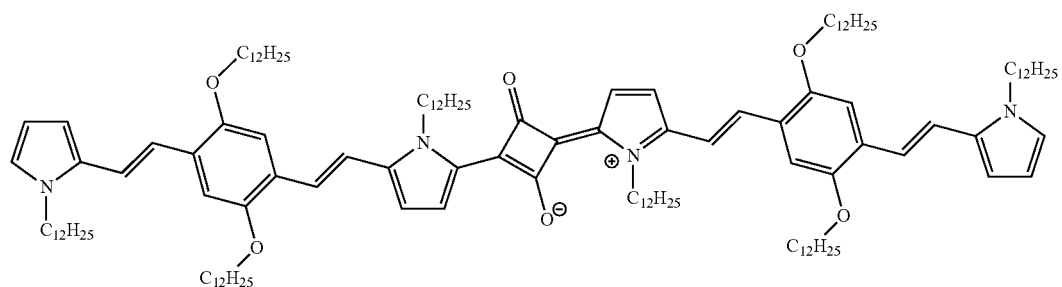
35
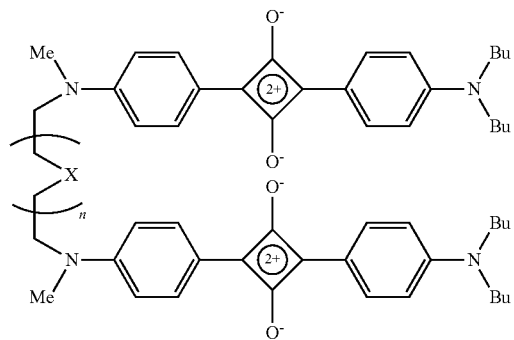
36
X is CH$_2$ and n is 2
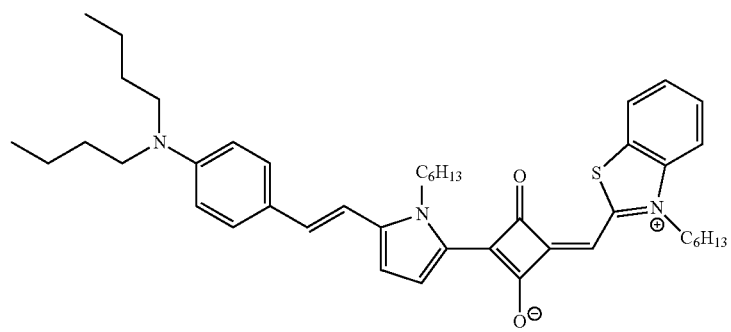
37

TABLE 1-continued
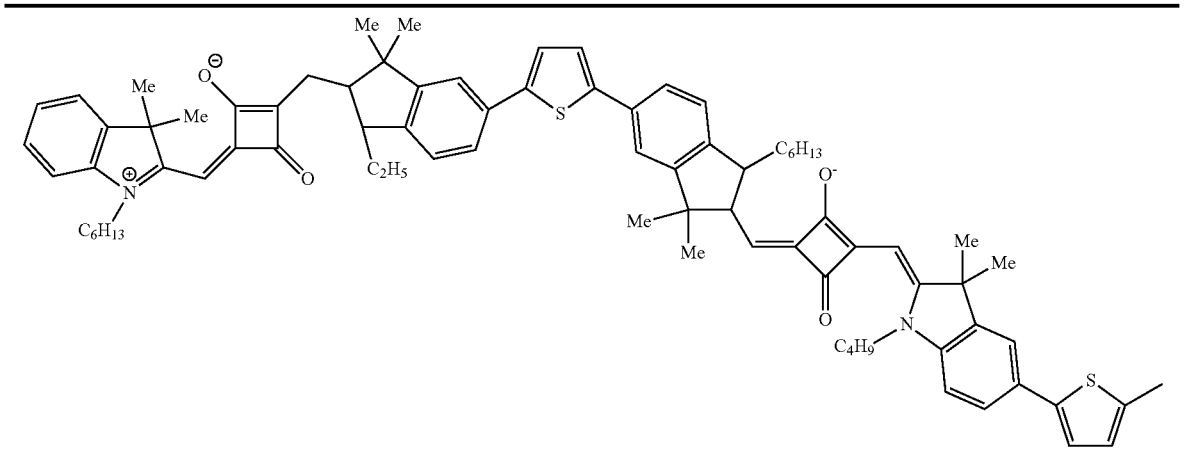
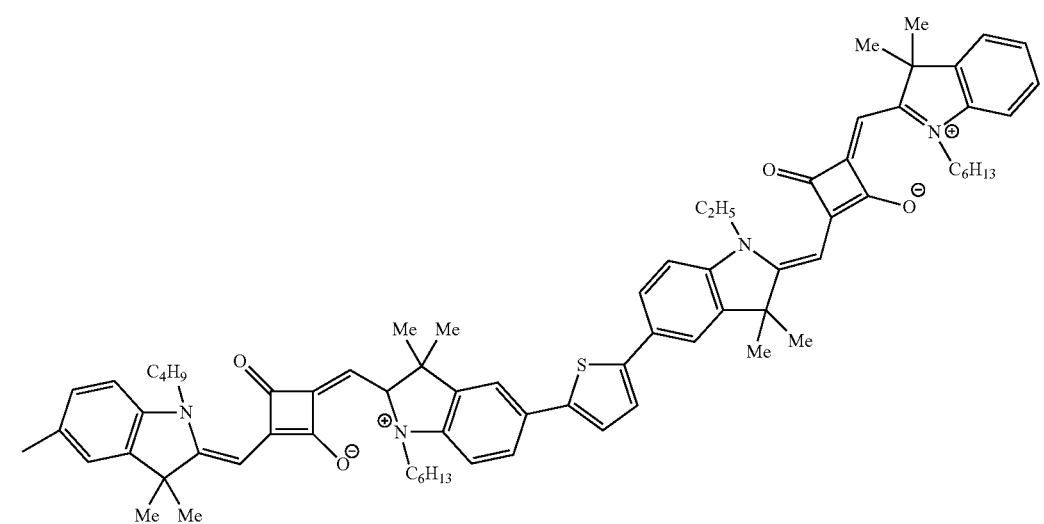
38
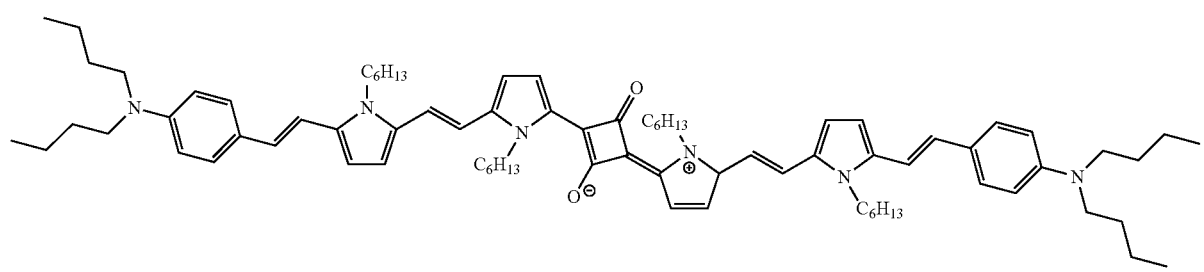
39
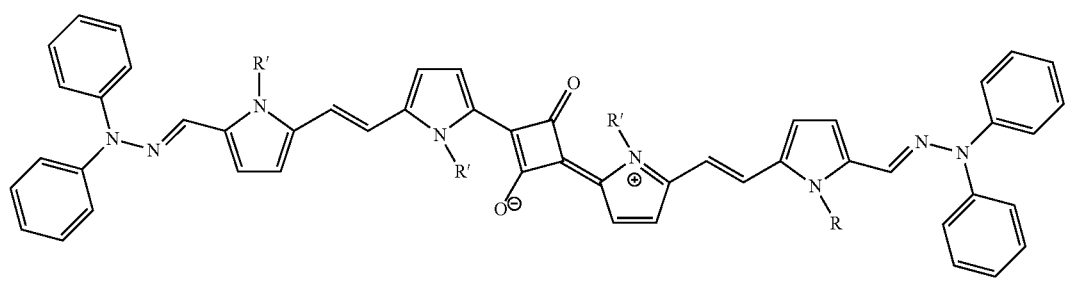
40
R' = (CH₂CH₂O)₃CH₃

TABLE 1-continued
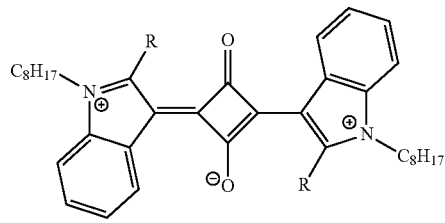
41
R is 2-ethylhexyl
42
R is n-dodecyl
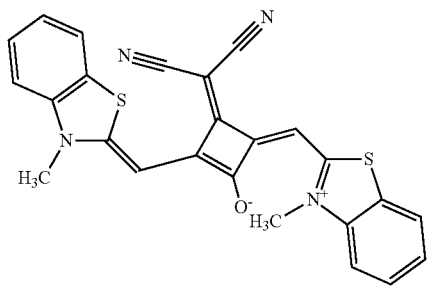 [SMILES: CN1/C(=C/C2=C([O-])C(=C\c3sc4ccccc4[n+]3C)/C2=C(C#N)C#N)Sc2ccccc21]
43
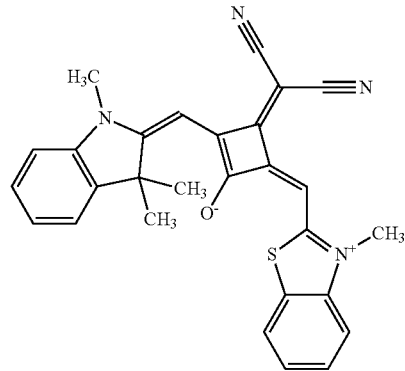 [SMILES: CN1/C(=C/C2=C([O-])C(=C\c3sc4ccccc4[n+]3C)/C2=C(C#N)C#N)C(C)(C)c2ccccc21]
44
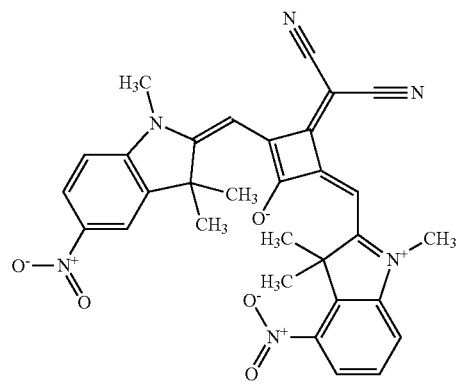 [SMILES: CN1/C(=C/C2=C([O-])C(=C\C3=[N+](C)c4cccc([N+](=O)[O-])c4C3(C)C)/C2=C(C#N)C#N)C(C)(C)c2cc([N+](=O)[O-])ccc21]
45

TABLE 1-continued
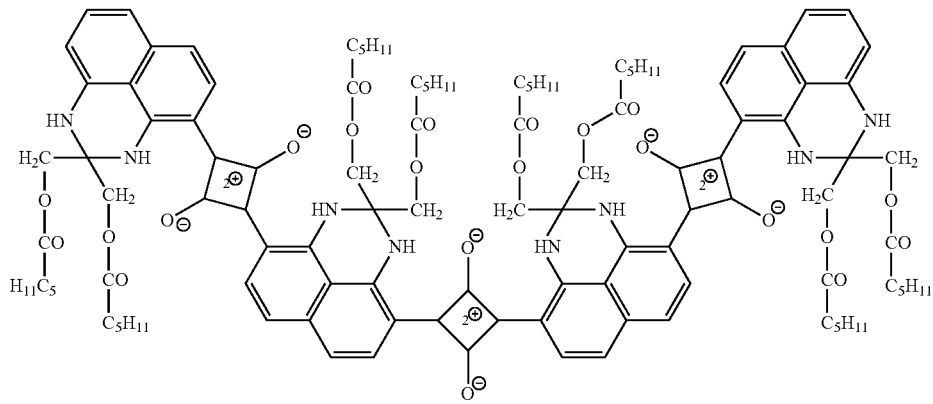
46
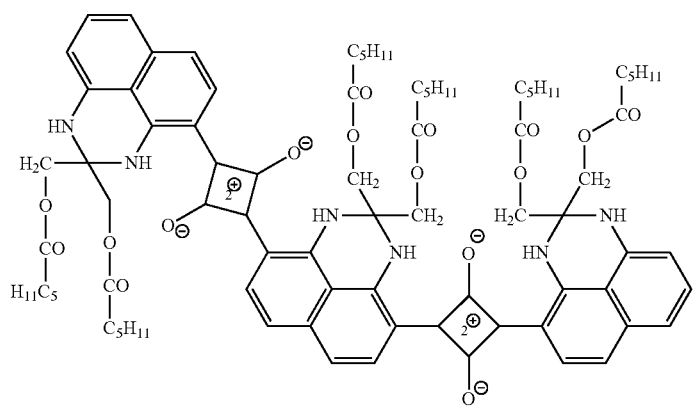
47
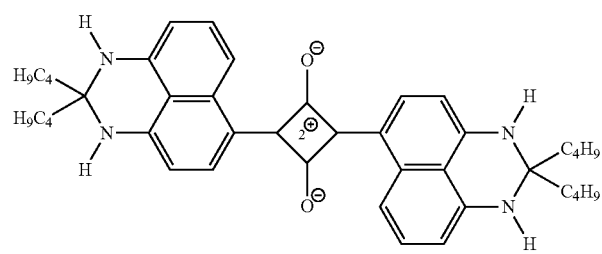
48
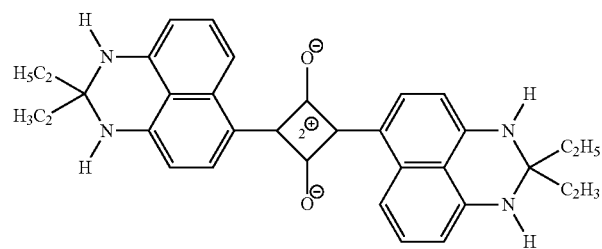
49

TABLE 1-continued
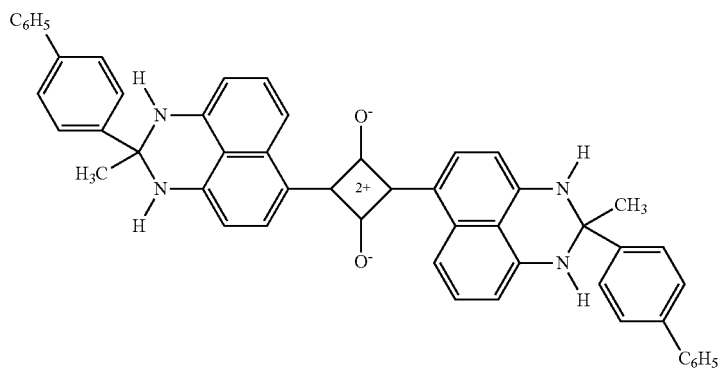
50
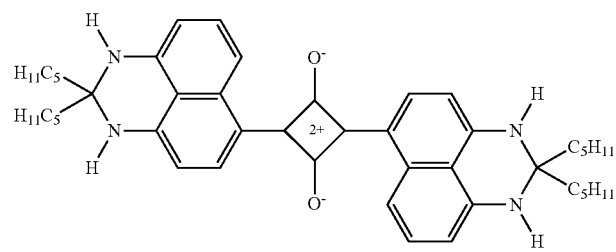
51
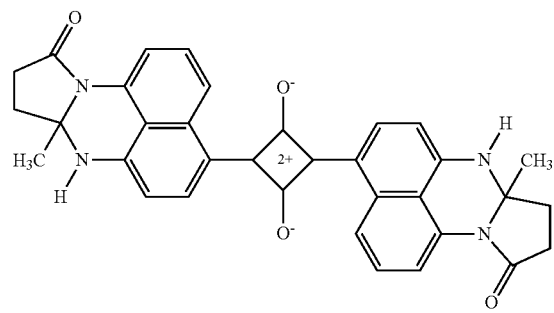 [SMILES: CC12CCC(=O)N1c1cccc3c(C4C([O-])C(c5ccc6c7c(cccc57)N5C(=O)CCC5(C)N6)C4[O-])ccc(c13)N2]
52
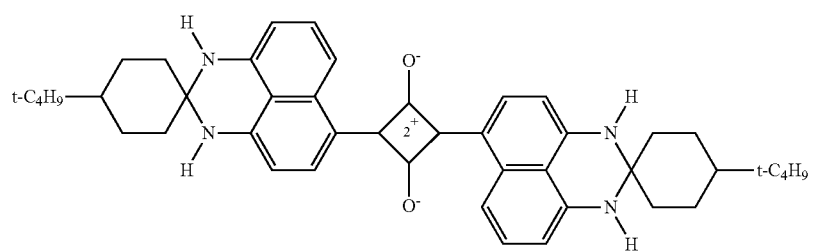
53

TABLE 1-continued
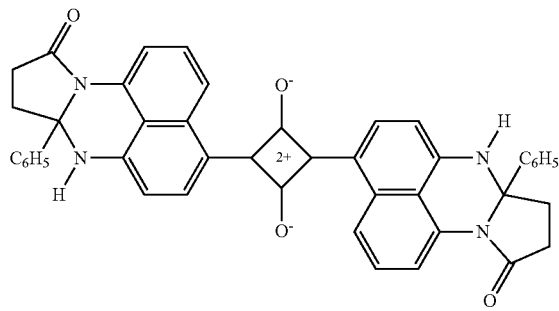
54
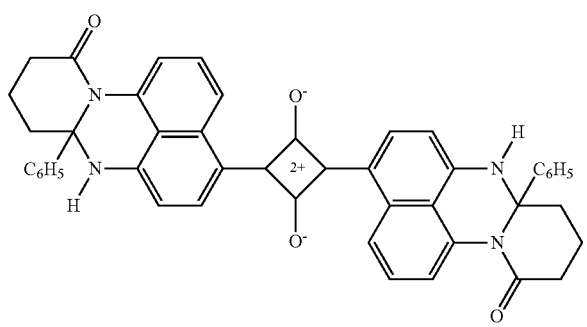
55
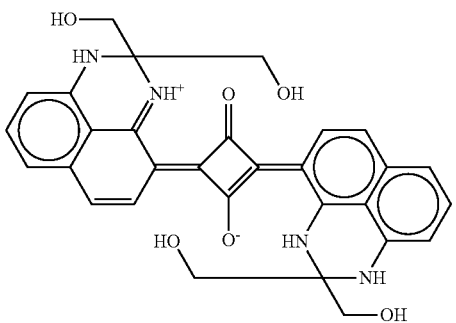
56
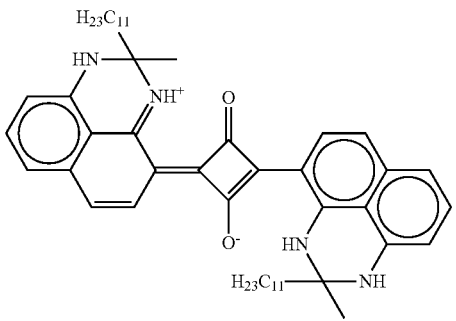
57

TABLE 1-continued
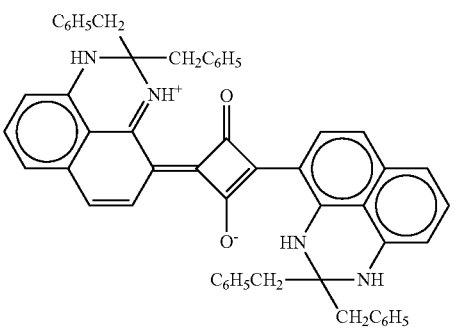
58
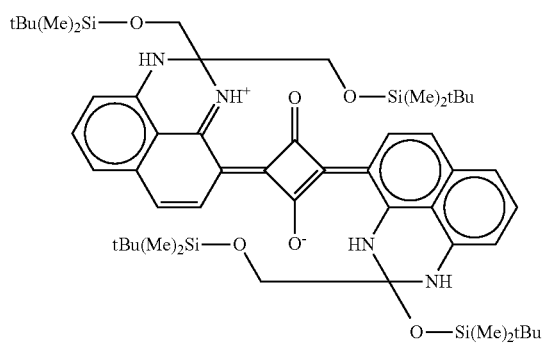
59
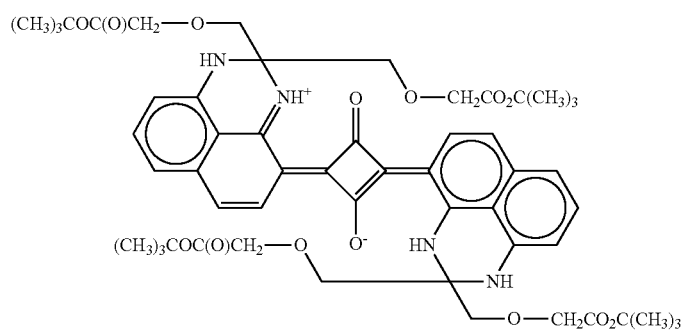
60
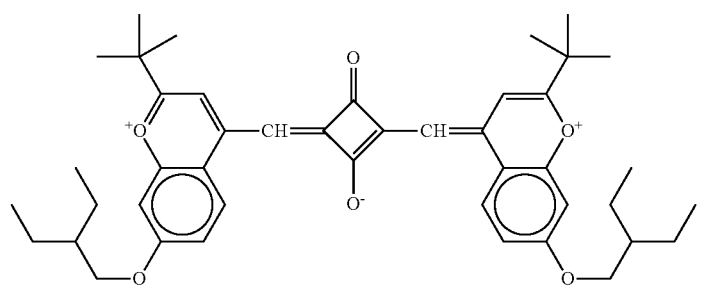
61

TABLE 1-continued
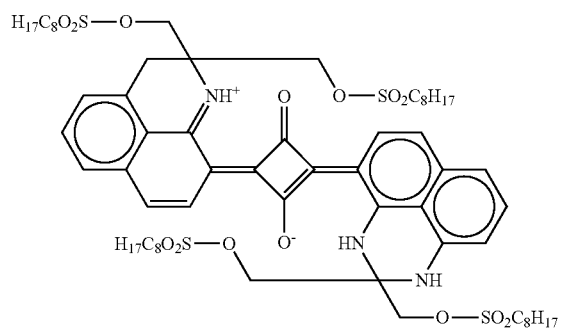
62
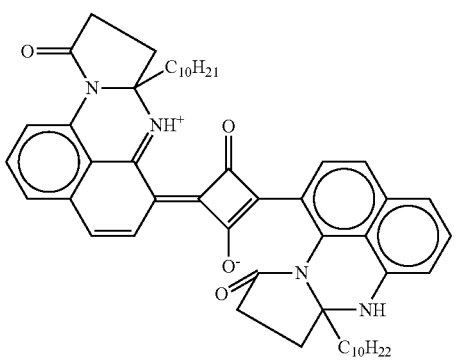
63
TABLE 2
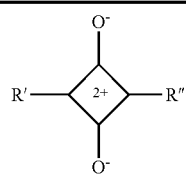
| # | R' | R'' |
|---|----|-----|
| 64 | 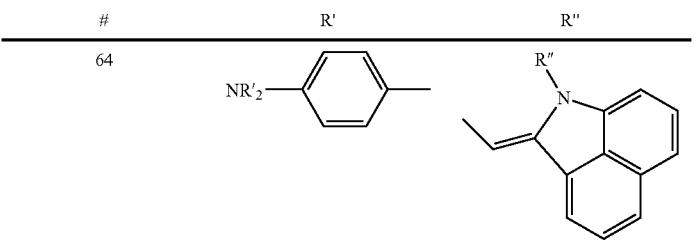 | |
| 65 | 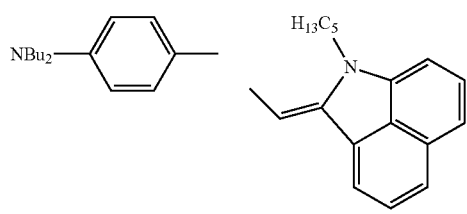 | |

TABLE 2-continued
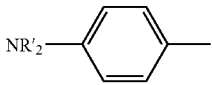
| # | R' | R" |
|---|----|-----|
| 66 | 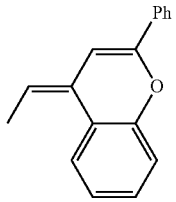<br>R'₂ = C₄—C₁₈ (NR'₂-phenyl-) | 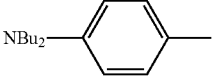 (2-phenyl-chromen-4-ylidene-ethyl) |
| 67 | NBu₂-phenyl- | 2-phenyl-chromen-4-ylidene-ethyl |
| 68 | julolidinyl- | 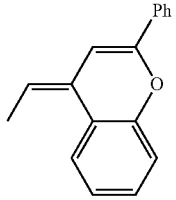<br>R" = C₅H₁₃—C₁₈H₃₇ |
| 69 | julolidinyl- | 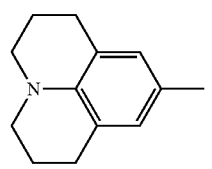<br>H₁₃C₅-N-benz[cd]indol-ylidene-ethyl |
| 70 | julolidinyl- | 2-phenyl-chromen-4-ylidene-ethyl |
| 71 | 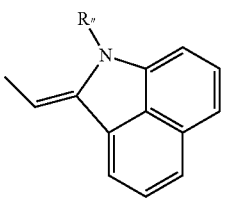 | 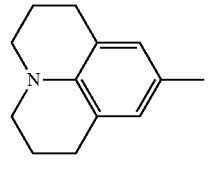 |
| | R''' = CH₃—C₁₈H₃₇ | R" = C₅H₁₃—C₁₈H₃₇ |

TABLE 2-continued

| # | R' | R" |
|---|----|----|
| 72 | (1,3,3-trimethylindol-2-ylidene)ethyl | 1-pentylbenz[cd]indol-2-ylidene)ethyl |
| 73 | (3,3-R'''-substituted-1-R'''-indol-2-ylidene)ethyl, R''' = CH$_3$—C$_{18}$H$_{37}$ | 2-phenyl-4H-chromen-4-ylidene)methyl (Ph) |
| 74 | (1,3,3-trimethylindol-2-ylidene)ethyl | (2-phenyl-4H-chromen-4-ylidene)methyl (Ph) |

To the extent that the terms "containing," "including," "includes," "having," "has," "with," or variants thereof are used in either the detailed description and the claims, such terms are intended to be inclusive in a manner similar to the term "comprising."

Further, in the discussion and claims herein, the term "about" indicates that the values listed may be somewhat altered, as long as the alteration does not result in nonconformance of the process or structure to the illustrated embodiment.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume values as defined earlier plus negative values, e.g., −1, −1.2, −1.89, −2, −2.5, −3, −10, −20, and −30, etc.

It will be appreciated that variants of the above-disclosed and other features and functions, or alternatives thereof, may be combined into many other different systems or applications. Various presently unforeseen or unanticipated alternative, modifications, variations or improvements therein may be subsequently made by those skilled in the art which are also intended to be encompassed by the following claims.

The disclosure and contents of the patents and patent applications referenced above are hereby incorporated by reference in their entirety.

What is claimed is:

1. A phase change ink composition comprising: a phase change carrier composition comprising:
    a wax; and
    a wax-soluble near-infrared (NIR) dye having an absorption maximum in the wavelength region from about 700 nm to about 1400 nm, wherein the wax-soluble NIR dye is represented by formula (II), (III), or (IV), a tautomer thereof, or a salt thereof, wherein formulas (II), (III), and (IV) are:

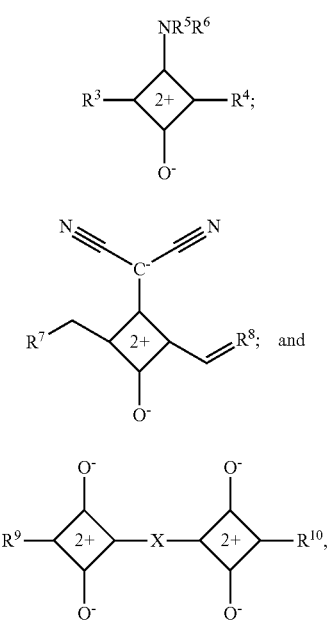

(II)

(III)

(IV)

wherein R³, R⁴, R⁷, R⁸, R⁹, or R¹⁰ is independently a cyclic group-containing residue comprising at least one cyclic group selected from the group consisting of (a) a substituted or unsubstituted heterocyclic group comprising at least one of N, S, or O, (b) a substituted or unsubstituted cycloalkyl group, (c) a substituted or unsubstituted aryl group, and (d) a substituted or unsubstituted aralkyl group;

wherein at least one of R³ or R⁴, comprises a substituted or unsubstituted perimidine group, wherein at least one of R⁷ or R⁸ comprises a substituted or unsubstituted perimidine group, wherein at least one of R⁹ or R¹⁰ comprises a substituted or unsubstituted perimidine group, wherein each of R³, R⁴, R⁷, R⁸, R⁹, and R¹⁰ independently comprises between about 10 and about 150 carbon atoms;

wherein each of R⁵ and R⁶ is independently selected from the group consisting of H and alkyl groups having from 1 to 6 carbon atoms; and wherein X is:

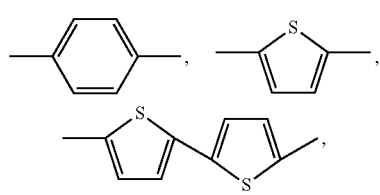

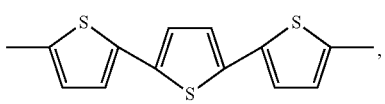

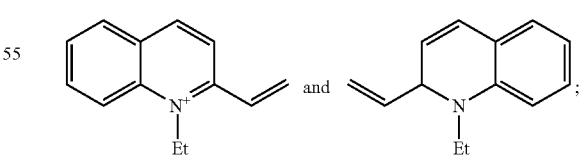

and wherein n is 1 to 5, wherein the phase change ink composition is in a solid phase at room temperature.

2. The phase change ink composition of claim 1, wherein the wax-soluble NIR dye has an absorption maximum in the wavelength region from about 700 nm to about 900 nm.

3. The phase change ink composition of claim 1, wherein the wax is a polyethylene wax having: a molecular weight between about 200 Da and about 5,000 Da.

4. The phase change ink composition of claim 1, comprising about 0.1 wt. % and about 80 wt. % of the wax relative to the total weight of the phase change ink composition, wherein an ink droplet of the phase change ink composition spreads upon exposure to infrared radiation.

5. The phase change ink composition of claim 1, comprising between about 0.01 wt. % and about 20 wt. % of the wax-soluble NIR dye relative to the total weight of the phase change ink composition.

6. The phase change ink composition of claim 1, wherein each of R³, R⁴, R⁷, R⁸, R⁹, and R¹⁰ comprises a substituted or unsubstituted perimidine group.

7. The phase change ink composition of claim 1, wherein at least one of R³, R⁴, R⁷, R⁸, R⁹, R¹⁰ comprises at least one linear alkyl group having 5 to 50 carbon atoms in addition to the cyclic group-containing residue.

8. The phase change ink composition of claim 1, wherein:

(i) R³ or R⁴ is independently selected from the group consisting of (ii) R⁵ or R⁶ is independently selected from the group consisting of H and alkyl groups having from 1 to 6 carbon atoms;

(iii) R⁷ or R⁸ is independently selected from the group consisting of

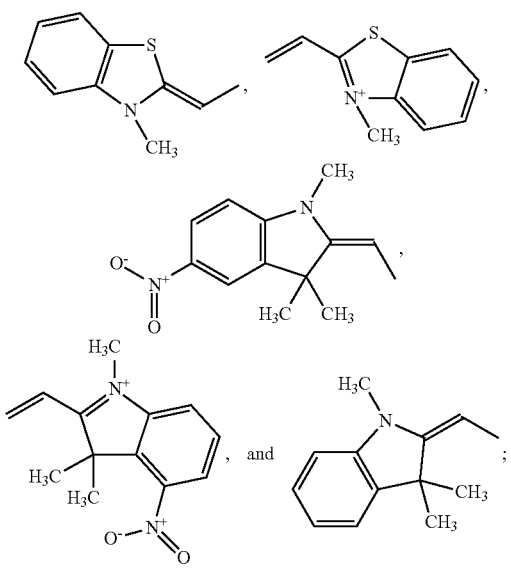

(iv)) $R^9$ or $R^{10}$ is independently selected from the group consisting of

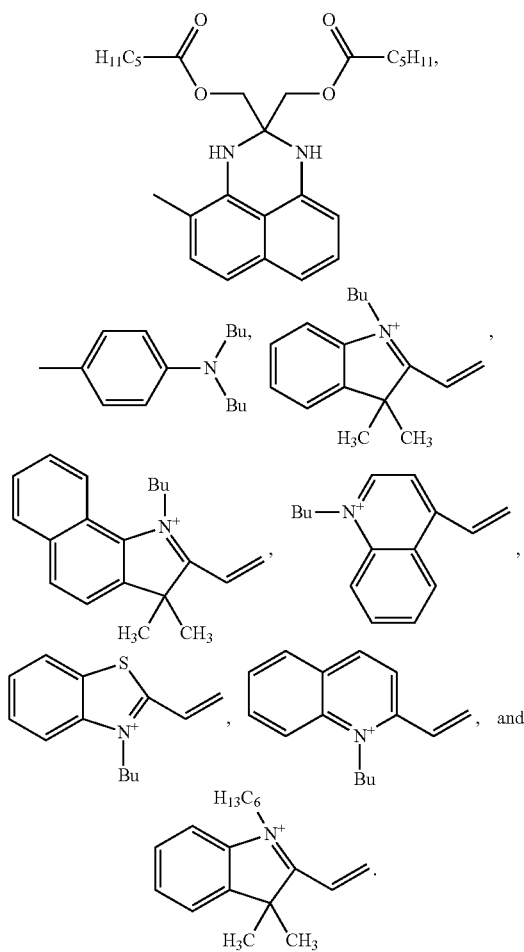

9. The phase change ink composition of claim 1, wherein the phase change carrier composition comprises:

(a) a urethane resin that is the reaction product of the reaction of at least one first alcohol and a first isocyanate, the alcohol being selected from the group consisting of hydroabietyl alcohol, octylphenol ethoxylate, and octadecyl alcohol; and/or (b) a mixed urethane/urea resin that is the reaction product of at least one second alcohol, a second isocyanate, and at least one monoamine; and (c) at least: one monoamide; and (d) at least one polyethylene wax.

10. The phase change ink composition of claim 9, wherein the second alcohol is selected from the group consisting of hydroabietyl alcohol, octylphenol ethoxylate and octadecyl alcohol.

11. The phase change ink composition of claim 9, wherein the second isocyanate is selected from the group consisting of a monoisocyanate, a diisocyanate, a triisocyanate, a copolymer of a diisocyanate, and a copolymer of a triisocyanate.

12. The phase change ink composition of claim 9, wherein the second isocyanate is isophorone diisocyanate.

13. The phase change ink composition of claim 9, wherein the monoamine is selected from the group consisting of an aliphatic monoamine, an aromatic monoamine, an aliphatic/aromatic monoamine, a fused ring system monoamine, and a hydroxyl/amino containing compound.

14. The phase change ink composition of claim 9, wherein the monoamine is octadecyl amine.

15. The phase change ink composition of claim 9, wherein the monoamide is stearyl stearamide.

16. A method for producing a layer of a phase change ink on the surface of a substrate, which comprises:

(1) employing in a printing apparatus a phase change ink composition in the solid phase comprising an admixture of (a) a phase change carrier composition and (b) a wax-soluble near-infrared (NIR) dye having an absorption maximum in the wavelength region from about 700 nm to about 1400 nm;

wherein the phase change carrier composition comprises (i) a urethane resin that is the reaction product of at least one first alcohol and a first isocyanate; and/or (ii) a urethane/urea resin that is the reaction product of at least one second alcohol, a second isocyanate and at least one monoamine; and (iii) at least one monoamide; and (iv) at least one polyethylene wax; and wherein the wax-soluble NIR dye is represented by formula (II), (III), or (IV), a tautomer thereof, or a salt thereof, wherein formulas (II), (III), and (IV) are:

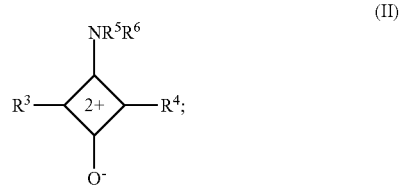

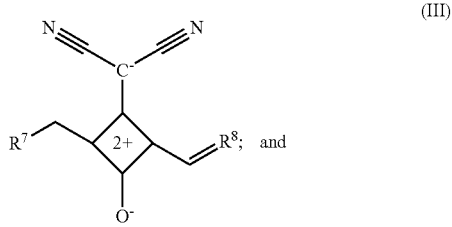

-continued

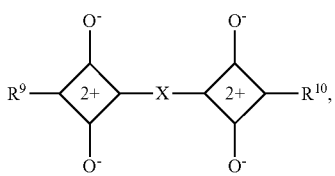
(IV)

wherein each of $R^3$, $R^4$, $R^7$, $R^8$, $R^9$, and $R^{10}$ is independently a cyclic group-containing residue comprising at least one cyclic group selected from the group consisting of (a) a substituted or unsubstituted heterocyclic group comprising at least one of N, S, or O, (b) a substituted or unsubstituted cycloalkyl group, (c) a substituted or unsubstituted aryl group, and (d) a substituted or unsubstituted aralkyl group;
wherein at least one of $R^3$ or $R^4$ comprises a substituted or unsubstituted perimidine group,
wherein at least one of $R^7$ or $R^8$ comprises a substituted or unsubstituted perimidine group,
wherein at least one of $R^9$ or $R^{10}$ comprises a substituted or unsubstituted perimidine group,
wherein each of $R^3$, $R^4$, $R^7$, $R^8$, $R^9$, and $R^{10}$ independently comprises between about 10 and about 150 carbon atoms;
wherein each of $R^5$ and $R^6$ is independently selected from the group consisting of H and alkyl groups having from 1 to 6 carbon atoms; and
wherein X is:

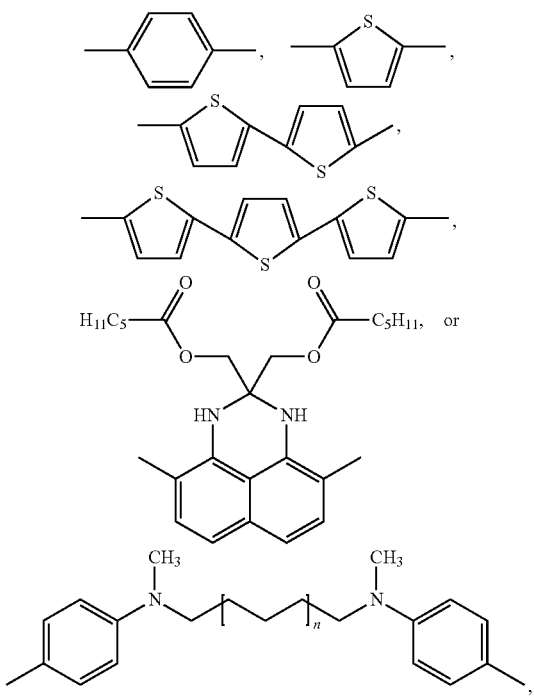

and
wherein n is 1 to 5, and wherein the phase change ink composition is in a solid phase at room temperature;
(2) applying the phase change ink composition in a desired pattern to an intermediate transfer surface;
(3) transferring the desired pattern of the phase change ink composition to the surface of the substrate.

17. A near-infrared print comprising: a substrate and a phase change ink composition disposed on a surface of the substrate, wherein the phase change ink composition comprises a phase change carrier composition comprising a wax and a wax-soluble near-infrared (NIR) dye having an absorption maximum in the wavelength region from about 700 nm to about 1400 nm, and wherein the wax-soluble NIR dye is represented by formula (II), (III), or (IV) a tautomer thereof, or a salt thereof, wherein formulas (II), (III), and (IV) are:

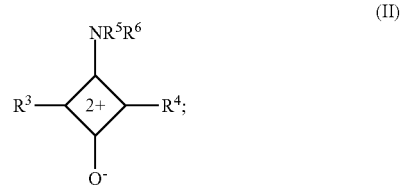
(II)

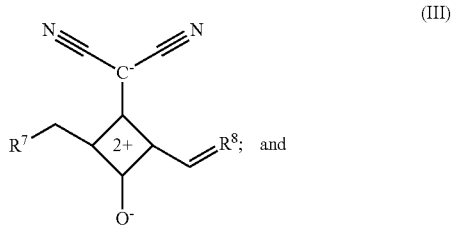
(III)

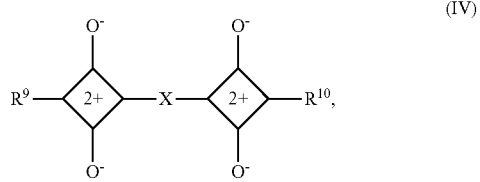
(IV)

wherein $R^3$, $R^4$, $R^7$, $R^8$, $R^9$, and $R^{10}$ is independently a cyclic group-containing residue comprising at least one cyclic group selected from the group consisting of (a) a substituted or unsubstituted heterocyclic group comprising at least one of N, S, or O, (b) a substituted or unsubstituted cycloalkyl group, (c) a substituted or unsubstituted aryl group, and (d) a substituted or unsubstituted aralkyl group;
wherein at least one of $R^3$ or $R^4$ comprises a substituted or unsubstituted perimidine group,
wherein at least one of $R^7$ or $R^8$ comprises a substituted or unsubstituted perimidine group,
wherein at least one of $R^9$ or $R^{10}$ comprises a substituted or unsubstituted perimidine group,
wherein each of $R^3$, $R^4$, $R^7$, $R^8$, $R^9$, and $R^{10}$ independently comprises between about 10 and about 150 carbon atoms;
wherein each of $R^5$ and $R^6$ is independently selected from the group consisting of H and alkyl groups having from 1 to 6 carbon atoms; and
wherein X is;

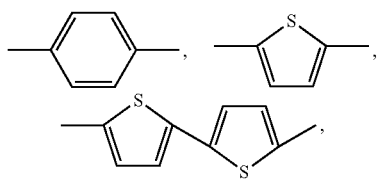

-continued

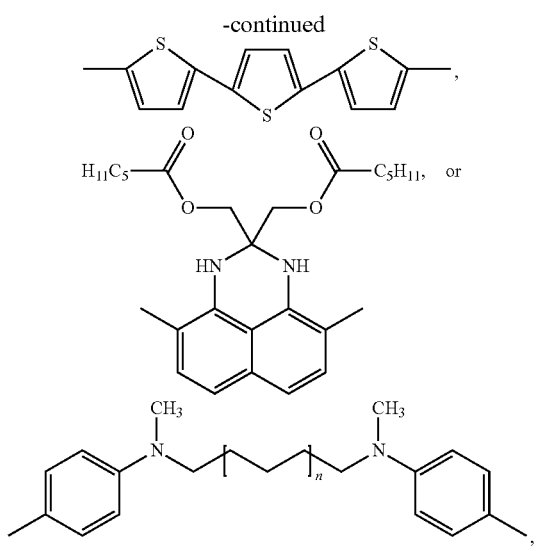

wherein n is 1 to 5, wherein the phase change ink composition is in a solid phase at room temperature.

18. The near-infrared print of claim 17, wherein the print is prepared by a method comprising:
(1) providing an admixture of (a) the phase change carrier composition; and (b) the wax-soluble NIR dye;
(2) transferring the solid phase, phase change ink composition to a phase change ink applicator;
(3) raising the operating temperature of the applicator to a level whereby a liquid phase, phase change ink composition is formed;
(4) providing the substrate in proximity to the applicator;
(5) applying a predetermined pattern of the liquid phase, phase change ink composition to the surface of the substrate; and
(6) lowering the temperature of the applied liquid phase, phase change ink composition to form a solid phase, phase change ink pattern on the substrate.

* * * * *